US007694270B2

(12) United States Patent
Mankotia et al.

(10) Patent No.: US 7,694,270 B2

(45) Date of Patent: Apr. 6, 2010

(54) SYSTEMS AND METHODS FOR FACILITATING AND MANAGING BUSINESS PROJECTS

(75) Inventors: Sanjeev Mankotia, Chicago, IL (US); George Adams, Wheaton, IL (US); Andrea W. Koop, Missouri City, TX (US)

(73) Assignee: Bank of America Corporation, Charlotte, NC (US)

( * ) Notice: Subject to any disclaimer, the term of this patent is extended or adjusted under 35 U.S.C. 154(b) by 1312 days.

(21) Appl. No.: 11/111,803

(22) Filed: Apr. 22, 2005

(65) Prior Publication Data

US 2005/0240898 A1 Oct. 27, 2005

Related U.S. Application Data

(60) Provisional application No. 60/564,598, filed on Apr. 23, 2004.

(51) Int. Cl.
*G06F 9/44* (2006.01)

(52) U.S. Cl. ........................ 717/101; 717/102; 717/106

(58) Field of Classification Search ......... 717/101–102, 717/106; 705/10–11

See application file for complete search history.

(56) References Cited

U.S. PATENT DOCUMENTS 5,206,582 A * 4/1993 Ekstedt et al. ............. 324/73.1
5,317,686 A * 5/1994 Salas et al. .................. 715/212
6,195,665 B1 * 2/2001 Jarett ......................... 715/251
2002/0129054 A1 * 9/2002 Ferguson et al. ............ 707/503
2003/0216919 A1 * 11/2003 Roushar ..................... 704/260
2004/0098372 A1 * 5/2004 Bayliss et al. .................. 707/3
2005/0015379 A1 * 1/2005 Aureglia et al. ............. 707/100
2005/0033710 A1 * 2/2005 Cochran et al. ............... 706/45
2005/0240457 A1 * 10/2005 Connally et al. ............... 705/7
2006/0037001 A1 * 2/2006 Irie et al. ..................... 717/120
2008/0077593 A1 * 3/2008 Abrams et al. ................. 707/9

OTHER PUBLICATIONS

Johansson et al. “Best modeling methods: trun lost production into profit—discrete event simulation applied on resetting performance in manufacturing systems”, Dec. 2002, Winter Simulation Conference, pp. 1065-1072.*

Neubauer et al. “Web Matrix: preliminary experiences in its use to introduce programming to non-majors”, Apr. 2004, Mid-South College Computing Conference; pp. 141-147.*

* cited by examiner

*Primary Examiner*—Anna Deng
(74) *Attorney, Agent, or Firm*—Banner & Witcoff, Ltd.

(57) ABSTRACT

Systems and methods for facilitating and managing a business project, include generating, on a computer, a plurality of primary fact sheets, each primary fact sheet being made up of a plurality of tiles. Each tile represents a predetermined attribute of a particular metric that is represented by the respective primary fact sheet. The fact sheets are grouped together into a fact sheet dictionary, which substantially characterizes fundamental requirements of the business project, such as requirements for a software application. At least one secondary fact sheet is linked to at least one of the fact sheets or tiles to provide additional details about the attribute of a particular metric. The fact sheet dictionary and secondary fact sheet(s) are stored for subsequent retrieval, display, and modification, and relied upon by decision makers to facilitate management of business projects.

39 Claims, 21 Drawing Sheets

Metric Fact Sheet: Shell

Objective:

Rationale:

Successful implementation requires:

Definition:

Reporting Frequency:

Raw Data Needed:

| | | |
|---|---|---|
| Tile 1 | Tile 2 | Tile 3 |
| Graph 1 | Graph 2 | Graph 3 |
| Tile 4 | Tile 5 | Tile 6 |
| Linkage with other Metrics: | Variables / Levers: | Open Issues: |
| Metrics Sub Team: | | |
| Tile 7 | Tile 8 | Tile 9 |

← 200

Metric Fact Sheet: Projected Average Hourly Rate

<u>Objective:</u> By optimizing resource utilization and skill set mix, drive down the average hourly rate of project development expense without adversely effecting Quality. Concurrently, optimizing the average hourly rate should not come at the expense of project delivery requirements.

<u>Rationale:</u> To improve cost effectiveness and ensure appropriate staffing mix.

<u>Successful implementation requires</u>:

- Effective demand planning to ensure optimal staff augmentation cost structure and staffing mix.

<u>Definition:</u> Weighted average billable hours of all Development efforts which includes various functional groups i.e. Developers, RAs, Testers, traditional consultants and ASP providers. Note: Rate does not include fixed fee consultants.

$$\left\{ \frac{(\#\text{ Bill Hrs consultant x (Rate* + Surtax)}) + (\#\text{ Bill Hrs FTE x Rate})}{\text{Total Bill Hrs}} \right\}$$

- Based on approved hours & Oracle rate table
- Excludes Oracle Project Hours (Actual billed hours)

<u>Reporting Frequency:</u>

Monthly

<u>Raw Data Needed:</u>

Artemis Hours by:

- Internal FTE
- Traditional Consultants
- ASP - Off Shore
- Additional attributes:
  - By RC
  - By Project (LOB/Product Line)
- Consultant rate table from Vendor Management (SEPs)
- Internal hourly rate table and consultant surcharge rate table from Oracle Projects
- Consultant Agreement ID

Weighted Average Hourly Rate - Rolling 12 Months

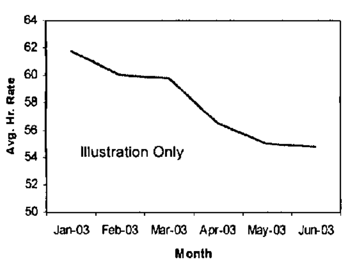

Report Types:
- Total ADSM
- RC/Rollup
- By LOB
- By Product Line
- By Completed Project (later phase)

Avg. Hourly Rate by Resource Type - Rolling 12 Months

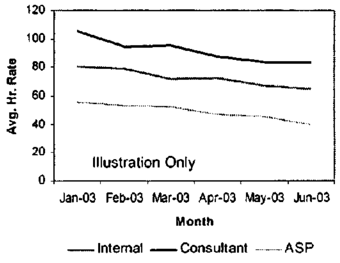

Report Types:
- Total ADSM
- RC/Rollup
- By LOB
- By Product Line
- By Completed Project (later phase)

Mix of Hours Utilized

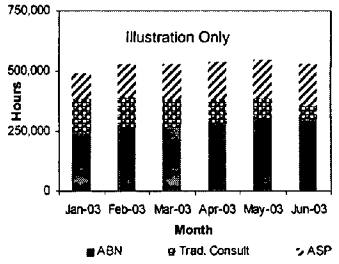

Report Types:
- Total ADSM
- RC/Rollup
- By LOB
- By Product Line
- By Completed Project (later phase)

<u>Linkage with other Metrics:</u>

- Project Capacity Utilization
- Project Delivery (On time, on budget, on requirements)

<u>Metrics Sub Team:</u>

- Sanjeev Mankotia
- Andrea Koop

<u>Variables / Levers:</u>

- Achieve better pricing value for traditional consultants.
- Integrate ASP consultants into "Projects" normally executed with higher priced resources.
- Skills Development :
  - Increase utilization and leverage of higher priced, skilled resources.
  - Improve internal staffing mix and skills sets to match demand.

<u>Open Issues:</u>

FIG. 3

Metric Fact Sheet: Project Capacity Utilization

Objective: To monitor and report on actual resource capacity and utilization, including FTE, ASP, and traditional Consultants.

Rationale: Effective resource utilization has a direct impact on ADSM's ability to control cost, balance resources and develop/cross train staff.

Successful implementation requires:
- Accurate time reporting (billable, non-billable, admin) by 100% of billable resources – FTE, ASP and traditional consultants.
- Transparency and timely provision of data to decision makers to make staffing adjustments (eg. effective demand planning).
- Resource skill and capability profiles are kept current and accurate to facilitate placement.

Definition:
The ratio of billable staffing capacity and budgeted capacity to actual hours billed.
- 1 FTE internal monthly capacity = 145 hours (reflects capacity net of admin time, vacation, sick leave, training, etc)
- 1 Traditional consultant monthly capacity = 173 hours
- 1 ASP consultant monthly capacity = 173 hours $$\frac{\text{Actual Hours Billed}}{\text{Budgeted Hours}} \quad \text{Or} \quad \frac{\text{Actual Hours Billed}}{\text{Capacity Hours}}$$

Reporting Frequency:
- Monthly

Raw Data Needed:
Artemis Approval 2 Billable Hours by:
- Internal FTE
- Traditional Consultants
- Offshore ASP Essbase
- Actual & Budgeted Internal FTE (Part-time and Full-time)
- Budgeted Consultant FTE SEPs Actual Consultant and Offshore ASP Headcount
Admin / Manager Mapping by RC and Job Code Time Allocation
RC Bill Type
FTE Hour Capacity Table
LOB Budget and Capacity %s by RC Data Definitions*:
- Budget = Budgeted FTE x 173 hours
- Capacity = Actual FTEs on hand x 173 hours
- Actual = All App2 hours logged into Artemis

**Actual vs Budget/Capacity* by Resource Type**

Hours will be broken down by resource type – internal, consultant, ASP (3rd dimension)

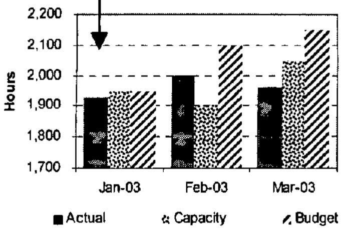

Report Types:
- Total ADSM
- By RC / Rollup
  - YTD
  - Rolling 12 Months
- By LOB
- By Product Line (Actuals Only)
  - YTD
  - Rolling 12 Months

Actual vs Budget/Capacity by Resource Type Utilization Percentages

| Overall | Jan-2003 | Feb-2003 | Mar-2003 |
|---|---|---|---|
| Act vs Bud | 99% | 95% | 91% |
| Act vs Cap | 99% | 105% | 96% |
| **Internal** | | | |
| Act vs Bud | 86% | 102% | 88% |
| Act vs Cap | 95% | 113% | 91% |
| **Consultant** | | | |
| Act vs Bud | 125% | 82% | 103% |
| Act vs Cap | 104% | 95% | 103% |
| **ASP** | | | |
| Act vs Bud | 100% | 94% | 91% |
| Act vs Cap | 100% | 100% | 100% |

Report Types:
- Total ADSM
- By RC / Rollup
  - YTD
  - Rolling 12 Months
- By LOB
- By Product Line (Actuals Only)
  - YTD
  - Rolling 12 Months

Actuals Resource Mix

Retail

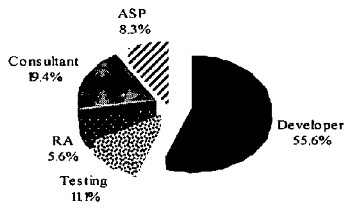

Internal FTE Total: 72.2%

Report Types:
- LOB / Product Line
  - YTD
  - Rolling 12 Months
- Total ADSM
  - YTD
  - Rolling 12 Months
- Project
  - LTD
  - By Month Linkage with other Metrics:
- Demand Planning
- Support Hours by Activity/Application Group Metrics Sub Team
- Walt Sunseri
- Sanjeev Mankotia
- Andrea Koop Variables / Levers:
- Project demand / consistency of demand
- Project approval timeline of Steering Committee
- Project completion timeline
- Skill requirements / availability Open Issues:
- ASP – Time keeping system for off-shore

FIG. 4

Metric Fact Sheet: Overall ADSM Resource Utilization

Objective: To monitor and report on actual resource capacity and utilization, including FTE, ASP, and traditional Consultants.

Rationale: Effective resource utilization has a direct impact on ADSM's ability to control cost, balance resources and develop/cross train staff.

Successful implementation requires:

- Accurate time reporting (billable, non-billable, admin) by 100% of resources – FTE, ASP and traditional consultants.
- Transparency and timely provision of data to decision makers to make staffing adjustments (eg. effective demand planning).
- Resource skill and capability profiles are kept current and accurate to facilitate placement.

Definition:

The percent breakdown of billable, non-billable, and admin hours based on capacity.

% Utilized = (Billable + Non-Billable + Admin) Hrs / Capacity hrs

- 1 resource monthly capacity (FTE, consultant or ASP) = 173 hours

Reporting Frequency:

- Monthly

Raw Data Needed:

Artemis Appl Hours by:

- Internal FTE
- Traditional Consultants
- ASP Offshore

Essbase

- Actual & Budgeted Internal FTE (Part-time and Full-time)
- Budgeted Consultant FTE SEPs Actual Consultant and Offshore ASP Headcount Admin / Manager Mapping by RC and Job Code Time Allocation RC Bill Type FTE Hour Capacity Table LOB Budget and Capacity %s by RC Data Definitions*:

- Budget = Budgeted FTE x 173 hours
- Capacity = Actual FTEs on hand x 173 hours
- Actual = All Appl hours logged into Artemis

**Actual vs Budget/Capacity* - By Resource Type**

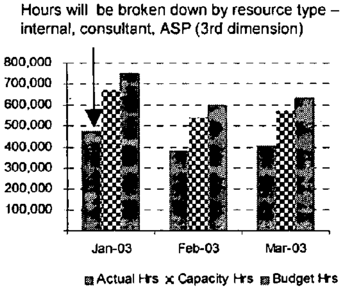

Report Types:
- Total ADSM
- RC / Rollup
  - YTD
  - Rolling 12 Months
- LOB
- Product Line (Actuals Only)
  - YTD
  - Rolling 12 Months

Actual vs Budget/Capacity – By Bill Type

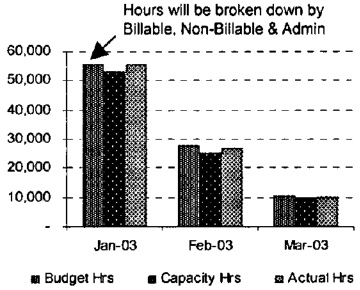

Report Types:
- Total ADSM
- RC / Rollup
  - YTD
  - Rolling 12 Months
- LOB
- Product Line (Actuals Only)
  - YTD
  - Rolling 12 Months

Mix of Actual Hours by Bill Type

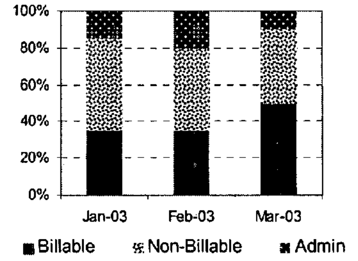

Report Types:
- Total ADSM
- RC / Rollup
  - YTD
  - Rolling 12 Months
- LOB
- Product Line
  - YTD
  - Rolling 12 Months Linkage with other Metrics:

- Demand planning / % hard demand
- Billable Hours Utilization

Metrics Sub Team

- Walt Sunseri
- Sanjeev Mankotia
- Andrea Koop

Variables / Levers:

- Project demand / consistency of demand
- Project approval timeline of Steering Committee
- Project completion timeline
- Skill requirements / availability Open Issues:

- ASP – Time keeping system for off-shore.
- Non-billable hours captured in Artemis include work other than Support or Admin (i.e. Infrastructure upgrades, Security/Compliance requirements, etc).

FIG. 5

Metric Fact Sheet: Support Hours by Activity/Application Group

Objective: To drive down application support costs by optimizing resource utilization without adversely effecting quality.

Rationale: Monitoring utilization by activity will help ensure appropriate staffing levels are maintained across support functions and Lines of Business. Activity tracking will also identify problem areas within applications which will facilitate long-term capital investment planning.

Successful implementation requires:

- 100% compliance with time-keeping system by support staff.

Definition:

- Total number of hours reported in Track View by Artemis support activity, by application. Support activities are categorized as follows:
  - Proactive Maintenance
  - Break-fix
  - Routine Maintenance
  - Planned / Non-discretionary (new releases, new functionality/code, etc.)
  - Ad hoc
  - Training
  - Other Reporting Frequency:

Monthly

Raw Data Needed:

- Artemis App2 support hours log. Data will be provided along the 7 support activities by:
  - By individual (employee, consultant, ASP staff)
  - LOB / Product Line
  - By RC / Rollup
  - By Application Group Data Definitions*:

- Budget = Budgeted FTE x FTE hour capacity
- Capacity = Actual FTEs on hand x FTE hour capacity
- Actual = App2 hours logged into Artemis
- 1 internal FTE monthly hours capacity = 145
- 1 consultant monthly hours capacity = 173

Actual vs Budget/Capacity*

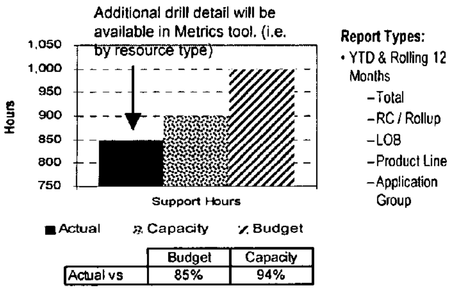

Actual Support Hour Activity Utilization Mix

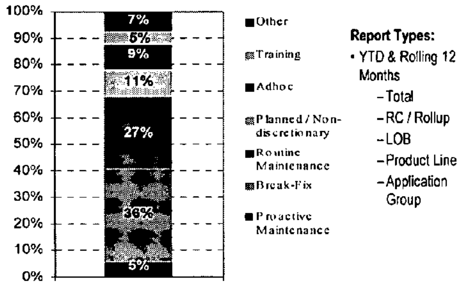

Actual Support Hour Utilization by Resource Type

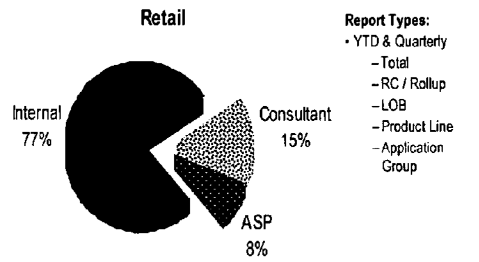

Linkage with other Metrics:

- Overall ADSM Resource Utilization
- Customer Satisfaction

Metrics Sub Team

- Sal Rosina
- Sanjeev Mankotia
- Andrea Koop

Variables / Levers:

- Where viable, integrate cheaper consulting to augment staff by using ASP and off-shore resources.
- Ensure best practice efforts by the Application Development staff to minimize transition/hand-off problems to the Support Group.
- Skills Development and thorough cross training to provide adequate levels of support using less resources.
- Drive more "Level 1" problems to the Service Desk by enhancing application knowledge through the development of tools such as FAQ and common problem scripts.

Open Issues:

- Capturing of time from non-ADSM resources to determine the true needs of supporting an application (Day 2 item)

FIG. 6

Metric Fact Sheet: Economic Profit (Relative Return on Initial Investment)

Objective: To reflect the weighted average Economic Profit (EP) contribution relative to the initial investment (exclusive of capital) required to achieve EP. *Note: Only target EP will be reflected. LOBs are responsible for tracking actual results.*

Rationale: Understanding the economic benefit of IT projects improves long-term strategic planning and decision-making.

Successful implementation requires:
- Complete business cases with clearly defined EP goals.

Definition: Economic Profit reflects the incremental benefit achieved on an annual basis after taxes and capital charges have been considered for new initiatives / investments. To achieve economic profit, investment in technology is often required. To evaluate the relative benefit of these investments, the following calculation will be utilized:

Relative Return on Initial Investment

$$\frac{\text{Annual Economic Profit}}{\text{(Total Initial IT Investment + Total Initial Business Investment)}}$$

Reporting Frequency:
Quarterly

Raw Data Needed:
- Approved major project business cases:
  - Total initial IT and Business investment (excluding capital)
  - Projected annual $ EP contribution (Years 1-5 of business case denoted in calendar years)
  - Project # (if available) and MPR#
  - Business case 1st year (project start)
  - Project classification (eg. strategic, compliance, etc.)
  - LOB & Product Line
  - Date approved (mm/yyyy)

Economic Profit P&L Calculation
Revenue
<Expense>
Operating Profit
<Loan Loss Reserves>
<Taxes>
Net Income
<Capital Charge @ 10.5%>
Economic Profit

Weighted Average EP as a Relative Return on Initial Investment (ROII) - Based on Selected Project Yr

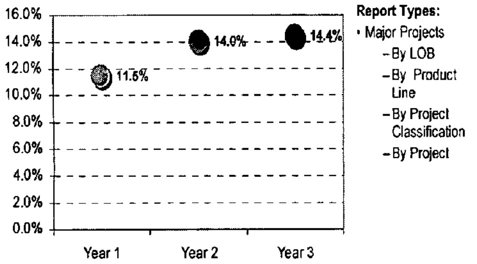

Weighted Average ROII EP of New Projects Approved During Most Recent Quarter

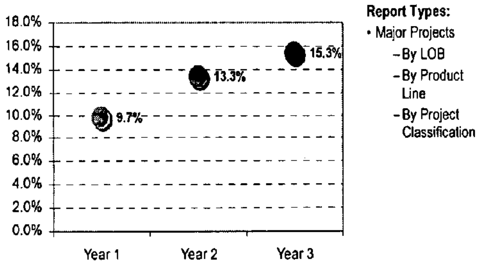

Annual ROII EP Distribution (# of Projects)

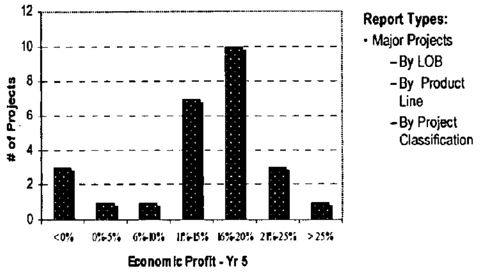

Linkage with other Metrics:
- Customer Satisfaction

Metrics Sub Team
- George Adams
- Lee Karlin
- Sanjeev Mankotia
- Andrea Koop

Levers / Variables:
- Complete / comprehensive business cases.
- Training on business case development.

Open Issues:

FIG. 7

Metric Fact Sheet: Audit Issues Performance

<u>Objective:</u> To ensure performance and regulatory compliance standards are met by IT system operations and structural design.

<u>Rationale:</u> Minimizing the number of medium & high audits a) ensures compliance with banking regulatory authorities and system operational integrity and b) optimizes the use of support funding by reducing the amount of hours needed to readdress significant audits.

<u>Successful implementation requires:</u>

- Consistent and clear definition of satisfactory audit requirements.
- Clearly defined audit issues and system implications.
- Knowledgeable and experienced IT Staff.

<u>Definition:</u> The occurrence and volume of IT related high and medium audit issues over time.

<u>Reporting Frequency:</u>

Monthly

<u>Raw Data Needed:</u>

- Audit issues list (Auditor Assistant)
- Audit rating criticality (high, medium, low)
- Audit Report Date (new audit issue)
- Audit Close Date
- Customer Relationship: LOB & LOB/Product Line

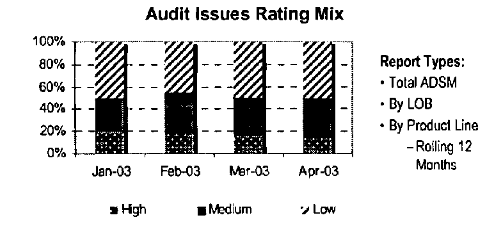

| Issue volume | Jan-03 | Feb-03 | Mar-03 | Apr-03 |
|---|---|---|---|---|
| High | 15 | 13 | 12 | 10 |
| Medium | 25 | 30 | 27 | 25 |
| Low | 40 | 35 | 37 | 35 |
| Total | 80 | 78 | 76 | 70 |

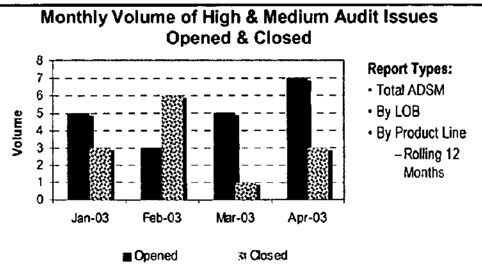

| | Jan-03 | Feb-03 | Mar-03 | Apr-03 |
|---|---|---|---|---|
| Net Change | 2 | (3) | 4 | 4 |

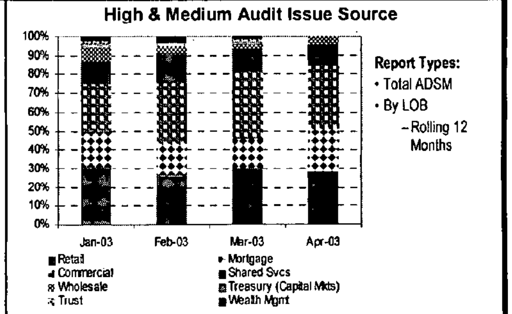

<u>Linkage with other Metrics:</u>

- Audit Resolution Efficiency
- Customer Satisfaction
- Overall ADSM Resource Utilization
- Support Hours by Activity / Application <u>Metrics Sub Team</u>

- John Grozek
- David Hyman
- Sanjeev Mankotia
- Andrea Koop

<u>Levers / Variables:</u>

- Training of IT CST and Support staff to understand audit issues and business implications.
- Definition of variables / criteria that must be met to achieve a satisfactory audit rating.

<u>Open Issues:</u>

FIG. 8

Metric Fact Sheet: Audit Issues Resolution Efficiency

<u>Objective:</u> To ensure performance and regulatory compliance standards are met by IT system operations and structural design.

<u>Rationale</u>: Resolving audit issues in a timely manner ensures compliance with banking regulatory authorities and system operational integrity.

<u>Successful implementation requires</u>:
- Clearly defined audit issues and system implications.
- Knowledgeable and experienced IT Staff.
- Accurate time keeping log - when audit issue received / when cleared.

<u>Definition:</u> Measurement of the time required to resolve high and medium audit issues relative to estimated completion time requirements and general efficiency targets (in days).

<u>Reporting Frequency:</u>
Monthly

<u>Raw Data Needed:</u>
- Audit issues list.
- Start date for audit resolution "clock"
- Implementation date (target close date)
- Actual Audit close/completion date
- # of audit extensions
- Customer Relationship: LOB and LOB/Product Line flags
- Audit rating criticality (high or medium)

Resolution Efficiency - Completed Audits (High & Medium Risk Issues)

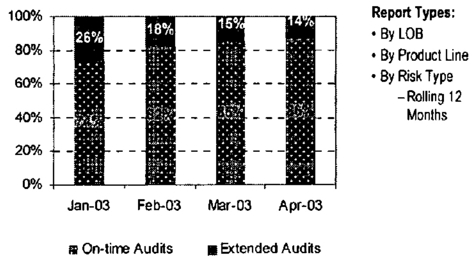

Average Resolution Time - Completed Audits (High & Medium Risk Issues)

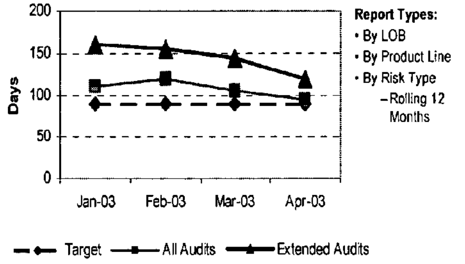

Completion Risk - Open Audits (High & Medium Risk Issues)

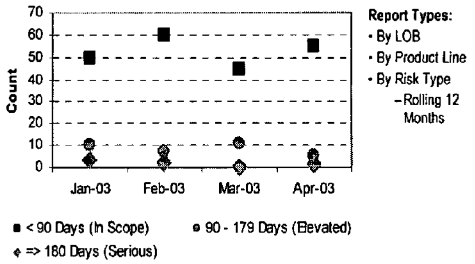

<u>Linkage with other Metrics:</u>
- Audit Performance
- Customer Satisfaction
- Overall ADSM Utilization
- Support Hours by Activity / Application <u>Metrics Sub Team</u>
- John Grozek
- David Hyman
- Sanjeev Mankotia
- Andrea Koop <u>Levers / Variables:</u>
- Training of Audit staff to clearly define audit issues.
- Training of Support staff to understand audit issues and business implications.
- Clearly defined audit resolution process. Process should involve Audit and IT's Application Support and Staff Utilization Groups.

<u>Open Issues:</u>

FIG. 9

Metric Fact Sheet: Testing Efficiency

Objective: To drive down hours spent System Testing vs. overall Project hours, without adversely effecting the quality and timing of Project Delivery.

Rationale: Testing effort (cost) will decrease and quality will increase by utilizing:

- Standard testing methodologies and best practices;
- Automated test scripts;
- Using dedicated testing experts.

Successful implementation requires:

- Clear / straight-forward testing methodologies.
- Commitment to use of standardized methodologies.
- Well trained and knowledgeable testing experts.
- Efficient test script writing.
- Accurate time keeping.

Definition: The relative time and cost of Testing as a function of overall project cost and delivery requirements. The following 2 ratios reflect this metric:

(1) $\frac{\text{Total Testing Hours}}{\text{Total Project Hours}}$ (2) $\frac{\text{Total Testing Hours Exp}}{\text{Total Project Hours Exp}}$ Reporting Frequency Monthly for completed projects Raw Data Needed:

For Completed/Closed Major Projects (Spending > $250k)

- Oracle App 2 and 3 Project hours by 14 MAP steps
- Project MPR#
- Project Hour Costs:
  - Total Project
  - Testing

Testing Hours / Total Project Hours (Completed Major Projects)

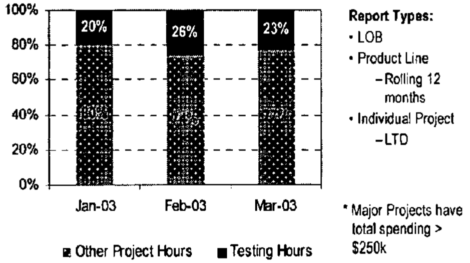

Testing Hours Expense / Total Project Hours Expense (Completed Major Projects)

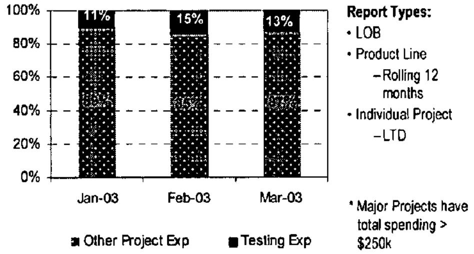

MAP Step Usage Distribution

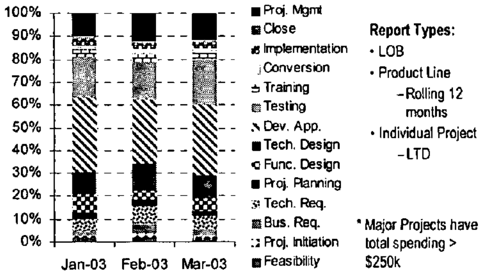

Linkage with other Metrics:

- Customer Satisfaction
- Production & System Test Defects
- Project Delivery
- Estimating Accuracy
- Billable Hours Utilization Metrics Sub Team

- Deb Meo
- Sanjeev Mankotia
- Andrea Koop

Variables / Levers:

- Increase the level of automated testing.
- Standardize testing procedures / methodologies.
- Integrate testing estimates into overall estimating accuracy.
- Provide training to achieve testing certification levels (promotes consistency and competence in test execution).
- Cross-train junior staff to lower costs.
- Improve requirement gathering and change control processes.
- Standard/Centralized Testing System
- MAP Training Open Issues:

FIG. 10

Metric Fact Sheet: Production & System Test Defects

Objective: To drive down the number of defects as the project progress thru the test phases: System, Performance, UAT and Production and reduce the number of defects from project to project in UAT and Production testing through the reuse of test scripts.

Rationale: Increasing the use of automated testing and standardized test methodologies will create a best practice environment, reducing overall testing effort (hours) and costs.

Successful implementation requires:

- Providing adequate training on new testing methodology.
- On-going adherence to new testing methodology and principles.
- Creating and re-using standardized test scripts.

Definition: Relationship (%) of defects found in early testing phases (pre-UAT) relative to the total number of defects over the life of the project.

- Trend analysis of this relationship will illustrate whether standardization and automation of processes and scripts drives down the number / % of defects found in later (more expensive) testing cycles (i.e. UAT and Production).

Reporting Frequency:

Monthly for Completed Major Projects (Spending > $250k)

Raw Data Needed:

- Individual MPR and support project numbers for projects exceeding $250k in spending at completion; Source: Source Oracle Projects
- LOB and Product Line relationship for completed projects: Source: Oracle Projects
- Test Defects by phase (8 phase approach); Source: Test Director
  - Pre-UAT: Unit, Integration, Pre-System and System
  - UAT, Pre-Production, Production Validation and Product
- Defect Severity Level; Source: Test Director

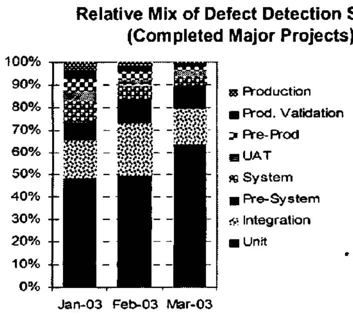

Report Types:
- LOB
- Product Line
  - Rolling 12 Months
- Individual Project
  - LTD

* Major Projects have total spending > $250k

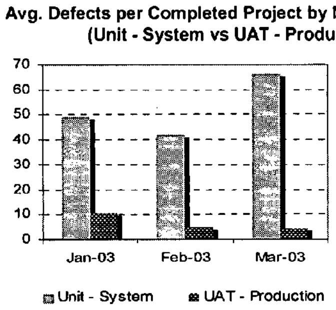

Report Types:
- LOB
- Product Line
  - Rolling 12 Months
- Individual Project
  - LTD

* Major Projects have total spending > $250k

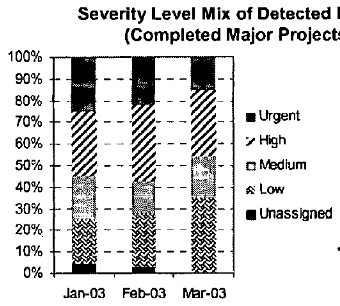

Report Types:
- LOB
- Product Line
  - Rolling 12 Months
- Individual Project
  - LTD

* Major Projects have total spending > $250k

Linkage with other Metrics:

- Testing Efficiency
- Project Delivery
- Customer Satisfaction
- Requirements Volatility Metrics Sub Team

- Deb Meo
- Sanjeev Mankotia
- Andrea Koop

Variables / Levers:

- Create and implement standardized testing methodology and process.
- Enhance tester knowledge and skills through training and certification processes.
- Develop a database of standardized test scripts to be used throughout IT organization.
- Conduct regular audits on test scripts to ensure integrity and robustness of testing.

Open Issues:

- Defect tracking is not contained in a single system – Test Director, PVCS

FIG. 11

Metric Fact Sheet: Customer Satisfaction

Objective: To ensure the Customer (LOB) is satisfied with the service and delivery of IT support and, all else equal, would choose AASC over an alternative provider.

Rationale: Maintaining customer satisfaction levels is integral to the operational success of IT. To continue to be an effective provider of services and to positively impact the Customer's bottom line P&L, IT must demonstrate that it can consistently maintain or exceed operational and performance benchmarks relative to alternative 3rd party providers.

Successful implementation requires:

- Strong CST relationship management / communication.
- At or exceeding par level across at least 3 critical dimensions: Project Delivery/Project Cost, Support / Responsiveness and Quality.

Definition: Weighted average approval of IT performance based on several key performance criteria (eg. quality, responsiveness, cost, etc.)

Reporting Frequency:

Semi-Annual

Raw Data Needed:

- Completed customer satisfaction survey data.

Performance by Measurement Category

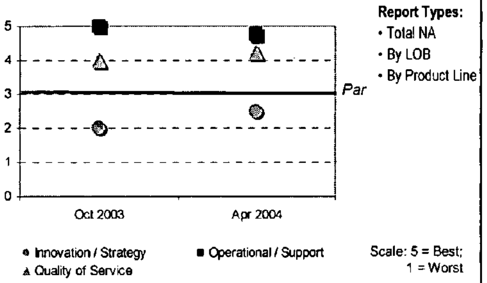

Service Delivery vs Customer Expectation Level (Most Recent Period)

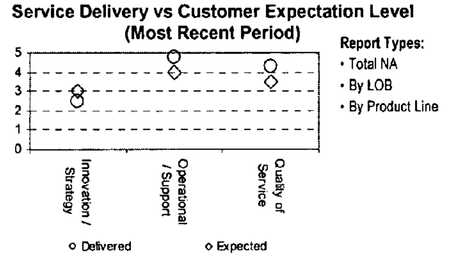

| Surveys Sent | # of Responses | Response Rate |
| --- | --- | --- |
| 210 | 75 | 36% |

Scale: 5 = Best; 1 = Worst

Overall Ranking

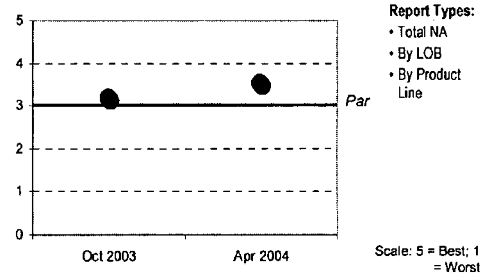

Linkage with other Metrics:

- Project Delivery
- Support Hours by Activity / Application
- Resource Utilization
- Average Hourly Rate Metrics Sub Team

- John Kelly
- Sanjeev Mankotia
- Andrea Koop

Variables / Levers:

- Continuous CST/LOB strategic planning and project review.
- Monthly reviews to address performance concerns and provide resolution status.
- Periodic reviews to evaluate "relationship health" - how is IT performing across critical dimensions?
- Periodic reviews to communicate to IT groups, customer goals and objectives as well as concerns and recent performance evaluation results.

Open Issues:

FIG. 12

Metric Fact Sheet: Break Fix

Objective: Identify high problem applications to develop long-term cost saving alternatives, reducing the on-going cost of Break-Fix support.

Rationale: Monitoring Break-Fix requirements by application will allow ADSM to identify opportunities to improve application usage and problem resolution training, software and / or break-fix resolution procedures to drive down long-term support costs.

Successful implementation requires:
- 100% compliance with Break-Fix problem resolution hour capture;
- Effective Break-Fix problem identification by application, by task type within Tivoli.

Definition:
- The relationship of Break-fix requirements relative to other ASG specific Support tasks and the relationship of time to fix relative to reported problems.

Reporting Frequency:
Monthly

Raw Data Needed:
- App2/3 Break-fix hours by: LOB / Product Line / Corp-RC & Corp-Rollup / Application Group
- Total App 2/3 Support Hours related to the Application Support Group tasks (total of 6).
- Break-fix call volume (filtered for true break-fix requirements)
- Severity level of call request
- Application UAI# associated with request

Break-Fix Hours as a % of Total Support Hours

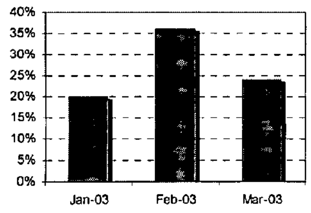

Report Types:
- By LOB
- By Product Line
- By Application Group
  - YTD
  - Rolling 12 Months Separate Tab:
- By RC / Rollup

| | Jan-03 | Feb-03 | Mar-03 |
|---|---|---|---|
| Break-fix Hours | 1,000 | 900 | 850 |

Break-Fix Request Call Volume

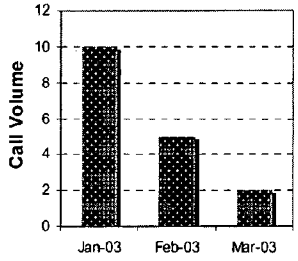

Report Types:
- By LOB
- By Product Line
- By Application Group
  - YTD
  - Rolling 12 Months Separate Tab:
- By Severity Level

Avg. Break-Fix Hours Required per Request

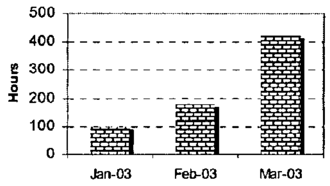

Report Types:
- By LOB
- By Product Line
- By Application Group
  - YTD
  - Rolling 12 Months

| | Jan-03 | Feb-03 | Mar-03 |
|---|---|---|---|
| Hours | 1,000 | 900 | 850 |
| # of Incidents | 10 | 5 | 2 |

Linkage with other Metrics:
- Support Hours by Activity/Application
- Production & System Test Defects
- Customer Satisfaction

- Metrics Sub Team
- Sal Rosina
- Sanjeev Mankotia
- Andrea Koop

Variables / Levers:
- Integrate cheaper consulting to augment staff by using ASP and off-shore resources (eg. "non-core" support activities).
- Ensure best practice efforts by the Application Development staff to minimize operational and transition problems to the Support group
- Emphasize skills development and cross training to improve quality, resolution time and staff utilization of Support group.
- Drive more minor/process problems to the Service Desk by enhancing application knowledge through the development of tools such as FAQ and common problem scripts
- Proactive maintenance.

Open Issues:

FIG. 13

Metric Fact Sheet: Requirement Volatility

Objective: To eliminate major and minimize minor changes to requirements.

Rationale: More stabile requirements will minimize impact to development efforts (hrs), project timelines and project budgets.

Successful implementation requires:

- Agreed and consistent:
  - Sign-off point for baseline requirements;
  - Change management process;
  - Definition of RFC (request for change).
- Consistent database source(s) of RFCs that can be mapped to baseline requirements.

Definition: The volume of change requests (in hours) relative to the initial estimate (baseline) and associated impact on costs.

Reporting Frequency:

Monthly for open projects with budget > $100k

Raw Data Needed:

- LTD App 2/3 Requirements hours
- Total Budgeted hours
- Reason for change
- Impact of change (hours and cost)
- Req. Analyst Name
- R.A. function (technical or functional)
- LOB
- Product Line
- MPR#
- Project#
- Type of project (eg. upgrade, new development)
- Calculated Average Hourly Rate (from Metric)

Requirements Hours Relative to Total Budgeted Hours

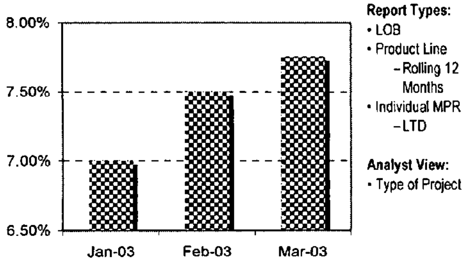

Change from Baseline Hours

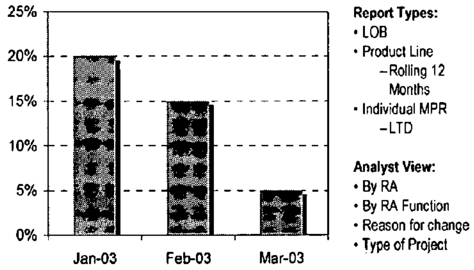

Estimated Cost of Change Requests

(Avg. Hourly Rate x Budgeted Hours of Change Requests)

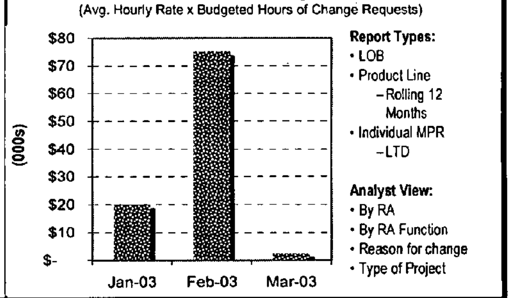

Linkage with other Metrics:

- Project Delivery
- Estimating Accuracy
- Customer Satisfaction
- Testing Efficiency Metrics Sub Team

- John Kelly
- Kelly Lacca
- Sanjeev Mankotia
- Andrea Koop

Variables / Levers:

- Standard requirement gathering methodology.
- Requirement analyst training (ensure as many requirements are gathered prior to coding as possible and that Client and IT clearly understand goals of requirements).
- Client education regarding cost/impact of changes.

FIG. 14

Metric Fact Sheet: Project Delivery

Objective:
- To meet or exceed the customer's expectation on project delivery.
- To assess the on time,on budget and within specifications performance indicators based on pre-defined and agreed AASC and Client specifications.

Rationale: Tracking project delivery will enable IT to more effectively manage financial and staffing resources, quality and ultimately Client satisfaction.

Successful implementation requires:
- Effective resource utilization and skill set management.
- Timely and effective use of capital and other project investment dollars.
- Clear and complete requirements prior to project commitment.

Definition:
- On time – based on customer driven requirement changes, project is delivered by original agreed upon completion date plus agreed and approved extensions by Client and IT.
- On budget – actual project costs are < or = to the original total binding estimate (provided at conclusion of Technical Design Phase) + or - any expenditure changes approved by the Client.
- Within specification (met requirements) – all (includes change requests) design and functionality requirements are included and fully operational.

Reporting Frequency:
Monthly for all open projects

Raw Data Needed:
- Project MPR#
- Project #
- LOB
- Product Line
- Acct Manager
- Project Lead
- Overall Project Budget
- Current Year Project Budget
- Total Project Spending
- Current Year Project Spending
- Project Start Date
- Budgeted Project End Date
- Reporting Month Date (based on last day of that month)
- Meets Requirements Flag (Y or N)

Actual Spending Relative to Budget (Target <= 100%)

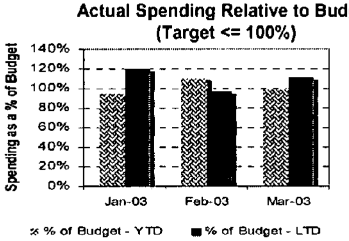

Report Types:
- LOB
- By Product Line
  - Rolling 12 Months
- By MPR#
  - LTD

| F/(L) Variance ($000s) | Jan-03 | Feb-03 | Mar-03 |
|---|---|---|---|
| YTD | (50) | 100 | (5) |
| LTD | 1,000 | (150) | 550 |

Performance Criteria Achievement - On Time / Meets Requirements (Target = 100%)

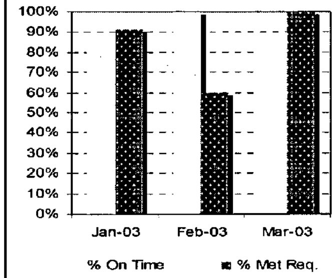

Report Types:
- LOB
- By Product Line
  - Rolling 12 Months
- By MPR#
  - LTD

Project Delivery - Overall Performance (Target = 100%)

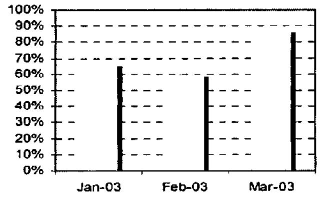

Report Types:
- LOB
- By Product Line
  - Rolling 12 Months
- By MPR#
  - LTD

| | Jan-03 | Feb-03 | Mar-03 |
|---|---|---|---|
| Met All Criteria | 8 | 3 | 7 |
| Total Projects | 12 | 5 | 8 |

Linkage with other Metrics:
- Requirements Volatility
- Customer Satisfaction
- Production & System Test Defects

Metrics Sub Team
- Sanjeev Mankotia
- Andrea Koop

Variables / Levers:
- Process standardization and training for IT and Clients
  - Requirements development;
  - Estimating and budgeting;
  - Change request and control;
  - Skill set requirements and timing of resource needs;
  - Using "MAP" process;
  - Effective monitoring by Project Mgr / Program Mgr.

Open Issues:

FIG. 15

Metric Fact Sheet: Forecasting Accuracy

Objective: To measure the quarterly variance between forecast/reforecast spending and hour requirements against actual performance/usage.

Rationale: Forecasting accuracy directly impacts resource utilization and staff planning. Improving forecasting accuracy ensures appropriate alignment of staff needs (internal, consultant, ASP) and skill sets -- directly impact bottom line operating results (project pool efficiency and project delivery).

Successful implementation requires:

- Effective staff utilization planning - ensuring resources are available to meet forecast demand.
- Effective project management - ensuring project tasks / deliverables are meeting forecast timelines.
- Requirements change control and tracking.

Definition: Forecasting accuracy measures the variance between anticipated project requirements and actual usage on a quarterly basis (quarterly re-forecasts allow the impact of requirements changes to be captured). Within Forecasting Accuracy, two key variables will be monitored and reported:

- Resource Hours/Mix Usage - Quarterly forecast of resource needs (hours and type) vs actual performance.
- Expense Usage - Quarterly forecast of project expenditures vs actual performance.

Reporting Frequency:

Quarterly

Raw Data Needed:

- Quarterly Forecast and Actual Hours for
  - Internal FTE
  - Traditional Consultants
  - ASP
  - On Shore
  - Off Shore
- Quarterly Forecast and Actual project costs Note1: Demand / Forecasting Db will take a "snapshot" of forecast projection on the last day of the previous quarter – snapshot data will be the basis for performance analysis.

Note2: Forecast Db is not dependent on a Δ Control Capture Db. [illegible]ges will be reflected in the forecast.

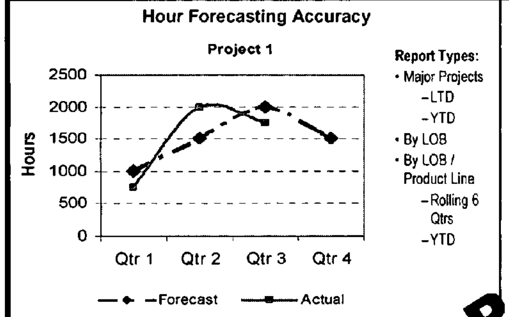

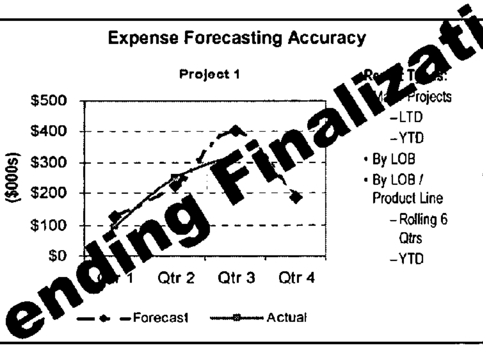

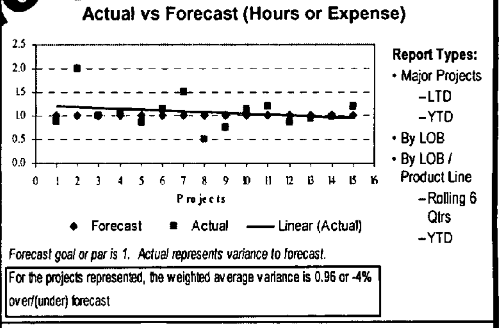

Linkage with other Metrics:

- Estimating Accuracy
- Customer Satisfaction
- Demand Planning
- Overall ADSM Resource Utilization
- Project Delivery Metrics Sub Team

- Lee Karlin
- Scott Adkins
- Sanjeev Mankotia
- Andrea Koop

Variables / Levers:

- Project Mgr/Lead Training.
- Established and consistent forecasting process.
- Potential use of Oracle Projects to provide automated workspace for Project Mgrs/Leads
- Demand planning - ensuring resources / skill sets are available when forecast.

Open Issues:

- Need to provide training on process / tool(s).
- ASP time keeping.

Pending Finalization

FIG. 16

Metric Fact Sheet: Demand Planning

<u>Objective:</u> To match real demand against forecast requirements; to flush out real resource utilization.

<u>Rationale</u>: Understanding hard/real demand will allow ADSM to:

- Align and plan projects to ensure appropriate resources / resource skill sets are available when required.
- Achieve cost efficiencies through better use of low cost providers (eg. ASP and/or Internal staff)
- Work with the LOBs to convert softer demand to maximize resource utilization and cost efficiencies.

<u>Successful implementation requires</u>:

- CST relationship management
- Effective staff utilization planning
- Effective project management and project delivery <u>Definition:</u> Hard demand (approved / gated funding) relative to total forecast spending and relative to total project pool budget.

*Note: Total forecast spending and total project pool budgets include all project classifications (hard, medium and soft)*

<u>Reporting Frequency:</u>

Monthly

<u>Raw Data Needed:</u>

- Project Database (updated monthly) itemized by:
  - Project spending
  - Project approval classification (hard, medium or soft)
  - Timing of project spending (by quarter)
  - LOB
  - LOB / Product Line

Hard Demand vs Budgeted / Approved Spending

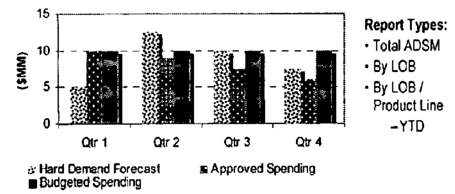

| Hard Demand as a % of | Qtr 1 | Qtr 2 | Qtr 3 | Qtr 4 |
|---|---|---|---|---|
| Budgeted Spending | 50% | 125% | 100% | 75% |
| Approved Spending | 50% | 139% | 133% | 125% |

Hard Demand Trend (8 Qtr)

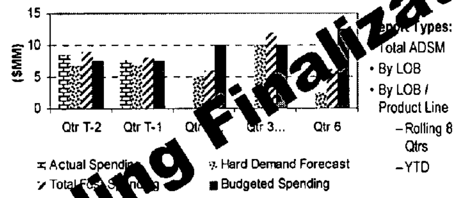

| Hard Dem[illegible] of | Qtr T-2 | Qtr T-1 | Qtr 1... | Qtr 3... | Qtr 6 |
|---|---|---|---|---|---|
| Total F[illegible]nding | 75% | 88% | 83% | 83% | 40% |
| [illegible] | 79% | 90% | | | |

Demand Distribution

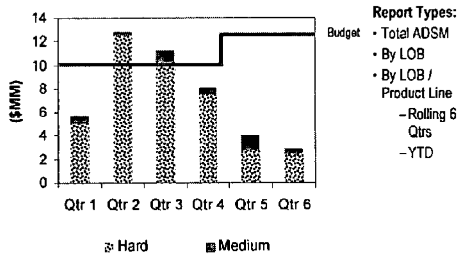

Pending Finalization

<u>Linkage with other Metrics:</u>

- Forecasting Accuracy
- Estimating Accuracy
- Customer Satisfaction
- Resource Utilization <u>Metrics Sub Team</u>

- John Kelly
- Lee Karlin
- Sanjeev Mankotia
- Andrea Koop

<u>Variables / Levers:</u>

- Clear understanding of "hard demand" classification - CST and business training on definitions.
- Continuous CST/LOB strategic planning and project review.

<u>Open Issues:</u>

- Robust project database with linkage to Forecasting tool(s).
- Database Maintenance Process - to ensure projects are added or converted to hard demand within project database on a monthly basis.

FIG. 17

Metric Fact Sheet: Estimating Accuracy

Objective: To measure the variance of the original estimate of resource hours and budget dollars against actual time/$ requirements.

Rationale: Optimizing estimating accuracy enhances ADSM's ability to match resources and resource skills against demand which improves overall operating efficiency. Estimating accuracy also enhances allocation of project dollars by more accurately reflecting what can be achieved during a budget/fiscal period.

Successful implementation requires:

- Clear and detailed requirements.
- Client commitment.
- Experienced and knowledgeable Requirement Analysts (Developers and Testers).
- Accurate change management control and tracking.

Definition: Within Estimating Accuracy, there are several categories that will be defined, tracked and reported:

- Resource Hours/Mix Usage - Initial estimate plus approved increases/decreases less actual hours.
- Budgeted Expense - Initial estimate of resource and other expenses plus approved increases/decreases less actual expense.
- Project Completion - Estimated completion date plus approved increases/decreases less actual completion date.

Reporting Frequency:

Monthly for completed projects.

Raw Data Needed:

- Budgeted and Actual Hours for
  - Internal FTE
  - Traditional Consultants
  - ASP
  - On Shore
  - Off Shore
- Budgeted and Actual project costs
- Approved Change Requests and associated hour, cost and completion date impact

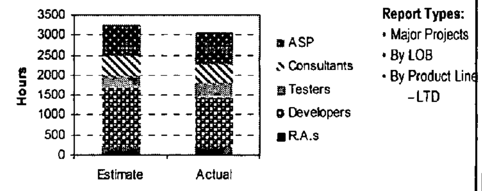

| Actual H/(L) Est. | R.A.s | Developers | Testers | Consultants | ASP |
|---|---|---|---|---|---|
| Hours Variance | (5) | 250 | (50) | 25 | (50) |
| % Variance | -3% | 17% | -17% | 5% | -7% |

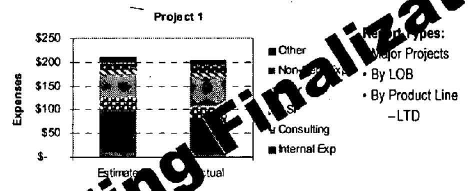

| Actual H/(L) Est. | In[illegible] | [illegible]nsulting | ASP | Dept | Non-Depr Exp | Other |
|---|---|---|---|---|---|---|
| Exp Var[illegible] | 15 | 5 | (15) | 3 | (3) | 2 |
| [illegible]ce | 15% | 20% | -30% | 30% | -20% | 20% |

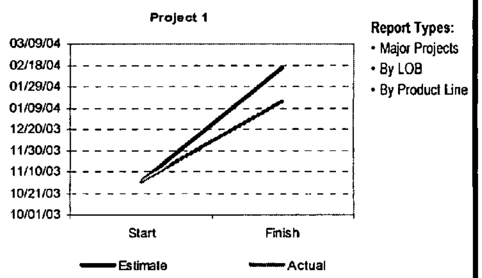

Linkage with other Metrics:

- Customer Satisfaction
- Resource Utilization
- Project Delivery

Metrics Sub Team

- Jean Kelm
- Lee Karlin
- Sanjeev Mankotia
- Andrea Koop

Levers / Variables:

- RA Training.
- Actual hours of involvement by Client.
- Historical project performance data capture and reporting (to be used for future project estimates).

Open Issues:

- Need synchronize Demand, Artemis and Oracle Projects Databases.
- Need to ensure final budget/estimates are clearly identified and captured as baseline.
- ASP time keeping.

Pending Finalization

FIG. 18

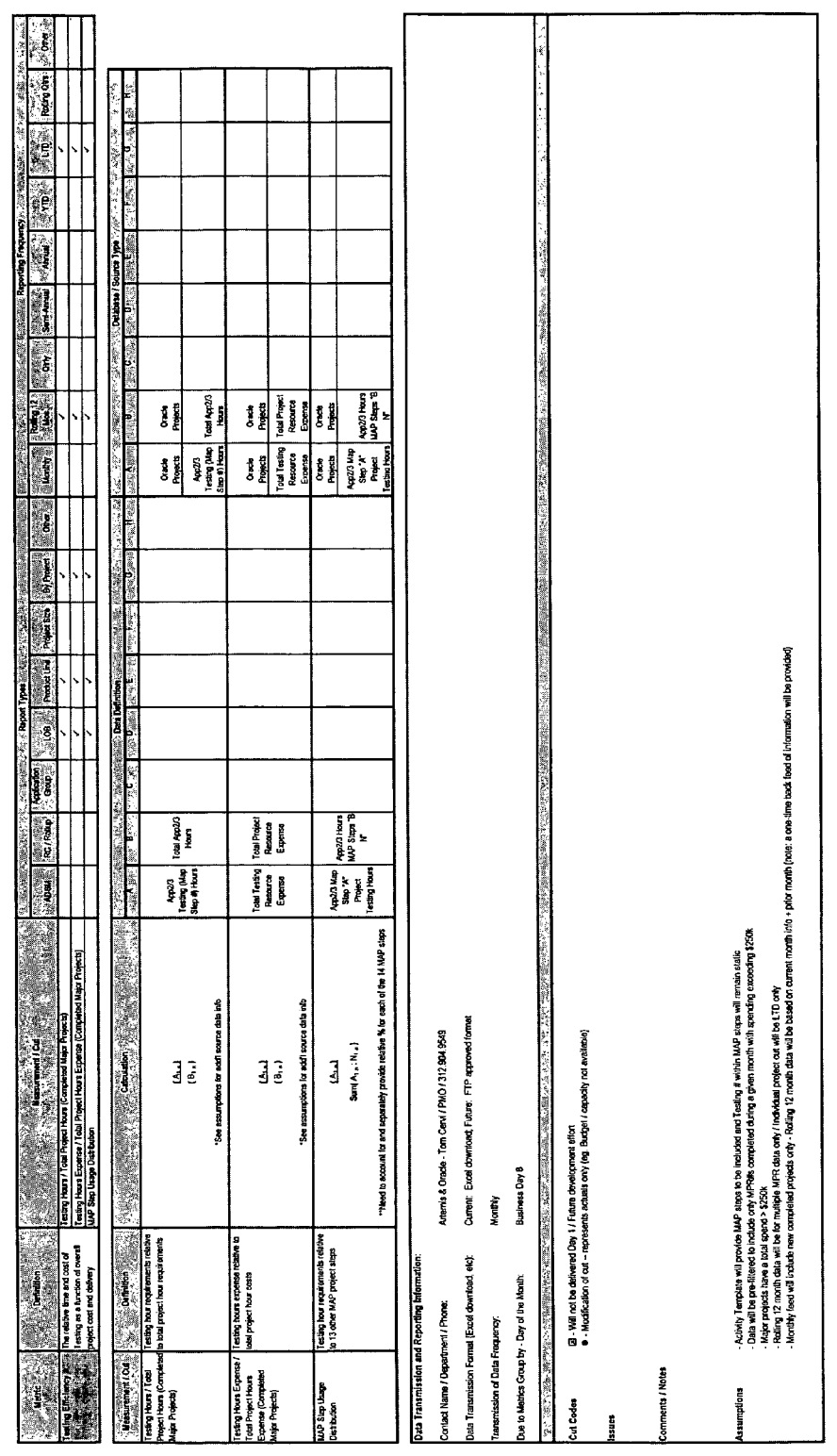

| Metric | Definition | Measurement / Cut | Report Types | | | | | | | | Reporting Frequency | | | | | | | | |
|---|---|---|---|---|---|---|---|---|---|---|---|---|---|---|---|---|---|---|---|
| | | | ADSM | RC / Rollup | Application Group | LOB | Product Line | Project Size | By Project | Other | Monthly | Rolling 12 Mos. | Qtrly | Semi-Annual | Annual | YTD | LTD | Rolling Qtrs | Other |
| Testing Efficiency [illegible] | The relative time and cost of Testing as a function of overall project cost and delivery | Testing Hours / Total Project Hours (Completed Major Projects) | | | | ✓ | ✓ | | ✓ | | | ✓ | | | | | ✓ | | |
| | | Testing Hours Expense / Total Project Hours Expense (Completed Major Projects) | | | | ✓ | ✓ | | ✓ | | | ✓ | | | | | ✓ | | |
| | | MAP Step Usage Distribution | | | | ✓ | ✓ | | ✓ | | | ✓ | | | | | ✓ | | |

| Measurement / Cut | Definition | Calculation | Data Definition | | | | | | | | Database / Source Type | | | | | | | |
|---|---|---|---|---|---|---|---|---|---|---|---|---|---|---|---|---|---|---|
| | | | A | B | C | D | E | F | G | H | A | B | C | D | E | F | G | H |
| Testing Hours / Total Project Hours (Completed Major Projects) | Testing hour requirements relative to total project hour requirements | $\frac{(A_{1,n})}{(B_{1,n})}$<br>*See assumptions for add'l source data info | App2/3 Testing (Map Step #) Hours | Total App2/3 Hours | | | | | | | Oracle Projects<br>App2/3 Testing (Map Step #) Hours | Oracle Projects<br>Total App2/3 Hours | | | | | | |
| Testing Hours Expense / Total Project Hours Expense (Completed Major Projects) | Testing hours expense relative to total project hour costs | $\frac{(A_{1,n})}{(B_{1,n})}$<br>*See assumptions for add'l source data info | Total Testing Resource Expense | Total Project Resource Expense | | | | | | | Oracle Projects<br>Total Testing Resource Expense | Oracle Projects<br>Total Project Resource Expense | | | | | | |
| MAP Step Usage Distribution | Testing hour requirements relative to 13 other MAP project steps | $\frac{(A_{1,n})}{Sum(A_{1,n} : N_{1,n})}$<br>**Need to account for and separately provide relative % for each of the 14 MAP steps | App2/3 Map Step "A" Project Testing Hours | App2/3 Hours MAP Steps "B-N" | | | | | | | Oracle Projects<br>App2/3 Map Step "A" Project Testing Hours | Oracle Projects<br>App2/3 Hours MAP Steps "B-N" | | | | | | |

Data Transmission and Reporting Information:

| | |
|---|---|
| Contact Name / Department / Phone: | Artemis & Oracle - Tom Cervi / PMO / 312.904.9549 |
| Data Transmission Format (Excel download, etc): | Current: Excel download; Future: FTP approved format |
| Transmission of Data Frequency: | Monthly |
| Due to Metrics Group by - Day of the Month: | Business Day 8 |

Cut Codes
- ☒ - Will not be delivered Day 1 / Future development effort
- ● - Modification of cut – represents actuals only (eg. Budget / capacity not available)

Issues

Comments / Notes

Assumptions
- Activity Template will provide MAP steps to be included and Testing # within MAP steps will remain static
- Data will be pre-filtered to include only MPR#s completed during a given month with spending exceeding $250k
- Major projects have a total spend > $250k
- Rolling 12 month data will be for multiple MPR data only / Individual project cut will be LTD only
- Monthly feed will include new completed projects only - Rolling 12 month data will be based on current month info + prior month (note: a one-time back feed of information will be provided)

FIG. 19

SYSTEMS AND METHODS FOR FACILITATING AND MANAGING BUSINESS PROJECTS

This application claims the benefit of U.S. Provisional Application No. 60/564,598, filed Apr. 23, 2004, which is herein incorporated by reference in its entirety.

BACKGROUND

1. Field of the Invention

The present invention relates to systems and methods that help streamline business processes, decision making and understanding. More particularly, the present invention relates to providing highly structured, easily visualized "fact sheets" and related supporting materials that are employed to formally present information to decision makers and others in a concise and organized fashion. In a non-limiting exemplary implementation of the invention described herein, the fact sheets are employed either alone or in conjunction with conventional software requirements documents to define the functionality expected from a software application that is to be developed. Such fact sheets can also be used to effectively manage a relatively large application development or business project.

2. Background of the Invention

The features and characteristics of the present invention are described herein, in large measure, in the context of developing a complex software application. However, those skilled in the art will appreciate that the concepts, architecture and methodologies according to the present invention are equally applicable to managing and facilitating virtually any type of large scale project.

Turning to the field of software, in accordance with conventional software development methodology, an entity desirous of a new software application is typically requested to draft a formal document setting forth each of the desired software application's functions or requirements. The resulting document is often referred to as a "requirements document," and often forms the basis of a contract or statement of work (SOW) to be accepted and executed by a software developer. Unfortunately, requirements documents are, among other things, typically very lengthy, include redundant (and even confusing) statements, and are not necessarily drafted as useful tools for software developers, resulting in a document that may make developing software, based on such a document, difficult.

Indeed, software requirements documents are often comprised of multiple levels of nested requirements set out in paragraph form that make the intent of a given requirement difficult to understand. Indeed, the order and wording of the requirements are often not chosen by programmers or coders who are expected to take the requirements document and, without further information, develop a software application that will meet or exceed the requirements indicated in the document. As will be appreciated by those skilled in the art, there is often a "disconnect" between what a programmer might think is being required, and what an entity desiring the software application intends. Such misunderstandings can lead to frustration, wasted time, and unnecessary expense.

In addition, as present day software applications tend to be relatively large, they are usually developed by a team of developers and coders, as opposed to a single person. A team approach to software development injects yet another source of uncertainty in the overall process. For instance, it is not uncommon for two different programmers to take opposing views with respect to what a particular requirement is, how such a requirement should be coded, or what data might be necessary to satisfy the requirement. Obviously, this type of confusion and disagreement can lead to similar frustration, wasted time, and unnecessary expense. The same deficiencies are often realized in many types of large business projects, outside of the software field.

There is, accordingly, a need to provide better tools for managing and facilitating business projects, including, but not limited to, software development.

There is also a need to provide improved management capabilities in connection with large scale projects, including, but not limited to, software application development.

BRIEF SUMMARY OF THE INVENTION

The present invention provides new and unique methodologies to facilitate and manage a business project, such as the development of new software applications. In a preferred embodiment, the present invention provides one or a series of "fact sheets" that encapsulate, both graphically and textually, core functionality and feature inter-relationships that are intended for the new software application. In one possible implementation of the present invention, the fact sheets are generated based on previously-drafted requirements documents, thereby enabling software developers to quickly understand the functionality they area expected to implement. In another possible implementation of the present invention, a requirements document and related facts sheets are generated substantially simultaneously, such that an iterative generation cycle naturally causes each of these documents to be consistent with each other and help to optimize each other. In yet another possible implementation of the present invention, the requirements document is eliminated entirely and software development proceeds solely on the basis of one or more fact sheets.

Preferably, the fact sheets are developed in a distributed manner using a network of computers, with one computer acting as a server and on which the fact sheets are stored for subsequent recall and/or modification.

In its simplest form, a fact sheet is a single page document that represents a predetermined feature of a given software application. In an exemplary software application described herein, the predetermined features correspond to several quantitative "metrics" that are associated with a given project. For example, such metrics can include such topics as Projected Average Hourly Rate, Project Capacity Utilization, and Overall Application Development and Software Maintenance for a given software development project. In accordance with the present invention, an individual fact sheet represents a respective metric.

The fact sheet itself is preferably broken up into individual sections, windows or "tiles," wherein each tile focuses on an attribute of the metric. Preferably, the same categories of attributes are respectively located in the same positions on each of the several fact sheets that define an overall business project or software development project. Thus, by quickly glancing at the several tiles, substantially all of the information necessary to provide concise project information, such as software coding instructions to developers, is made available, at least for the particular metric described by a given fact sheet. As a result, it is not necessary, especially at an early stage of software development, to consult a requirements document to determine how to proceed with the development project. The information presented on each fact sheet, and in the tiled format described, provides a quick reference guide that provides at least the fundamental functionality and inter-relationships that a programmer needs to begin development.

These fact sheets also provide information useful to management personnel who are responsible for monitoring the development project.

The fact sheets described above may be referred to as a "primary" fact sheets. In accordance with principles of the present invention, a given primary fact sheet and individual tiles on that fact sheet, may be separately supported by at least one "secondary" fact sheet, which provides even further detail to assist the software developers, and those individuals initially responsible for defining the functionality (or requirements), to more accurately define the intended functionality. For example, a tile on a primary fact sheet might indicate that an option of a graph should be available to an end user. The secondary fact sheet might then include a specific calculation or formula for generating the data to be plotted on that graph.

The use of structured fact sheets in accordance with the present invention establishes a more organized approach to software (i.e., application) development. As is described and shown in more detail later herein, fact sheets related to individual metrics include information regarding, among other things, objectives of the metric, logic underlying data generation and aggregation, linkages with other metrics, and variables or "levers," the latter of which relate to information that provides a more comprehensive understanding of the scope of the metric being described in the fact sheet.

As will be appreciated by those skilled in the art, each fact sheet preferably contains sufficient information thereon to enable a decision maker, project leader, etc., to make informed decisions about the given project.

Yet another aspect of the present invention is the use of a performance scorecard. A performance scorecard preferably summarizes the several metrics that are the subject of the several fact sheets. The scorecard is preferably presented to manager level personnel to enable those personnel to better track and monitor resources being used in the course of application development.

These and other features of the present invention are described in further detail below in conjunction with associated drawings.

BRIEF DESCRIPTION OF THE DRAWINGS

FIGS. 3-18 are exemplary primary fact sheets in accordance with the present invention.

FIG. 19 is an exemplary secondary fact sheet in accordance with the present invention.

DETAILED DESCRIPTION OF THE INVENTION

The obstacles to efficient business project management and organization, including software application development are many, as described above. The present invention provides systems and methods for overcoming some of the more difficult of these obstacles. Specifically, and in the exemplary context of software development, the present invention provides systems and methodologies for augmenting, or even eliminating, a developer's reliance on "requirements documents," those documents that typically comprise multiple pages of prose that may, or may not, provide the type of guidance that a developer expects or that is most suitable for coding.

Figure 1:
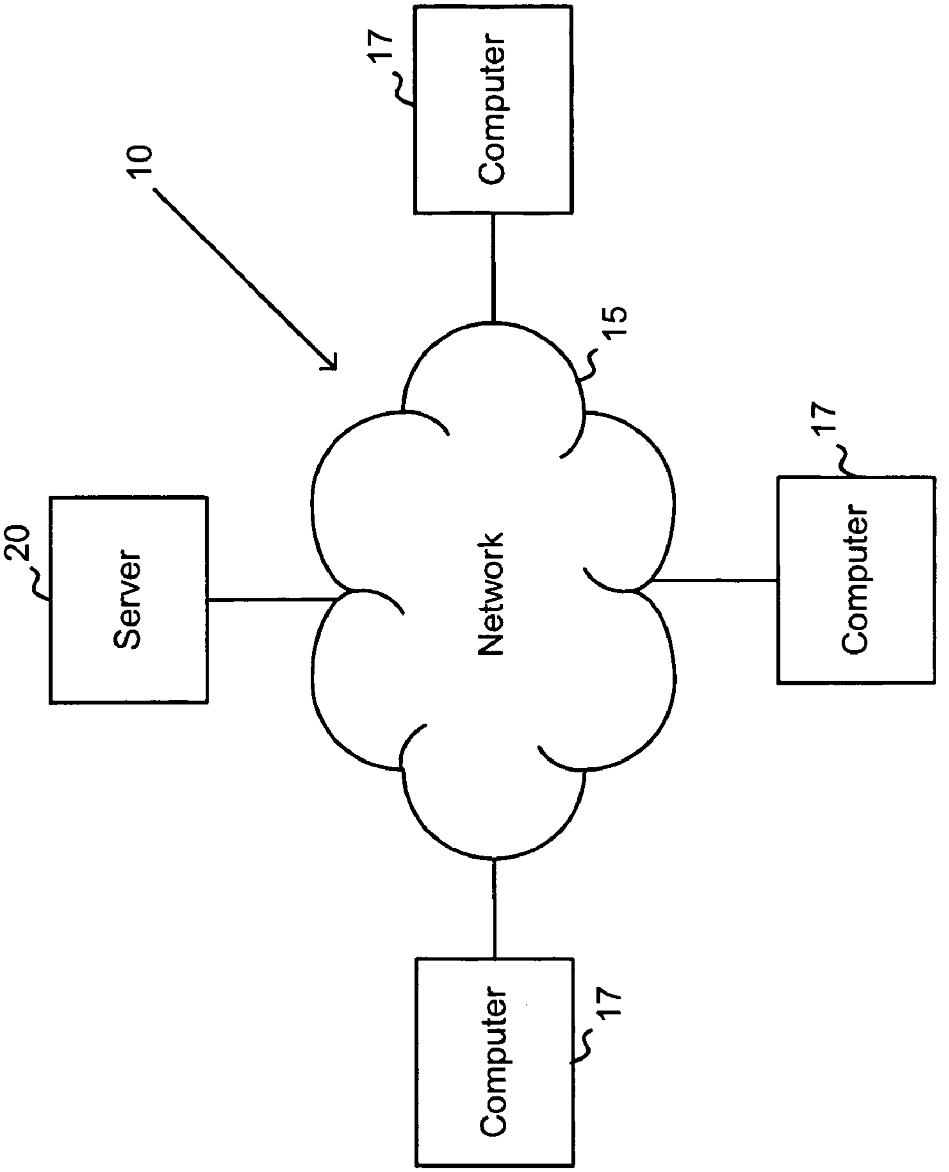
FIG. 1 is a schematic diagram showing an environment in which the present invention operates.

FIG. 1 is a schematic diagram showing an environment 10 in which the present invention preferably operates. Specifically, there is shown a network 15, such as a LAN, WAN, virtual private network, the Internet, etc., that interconnects a plurality of computers 17, one of which preferably operates as a server 20. Server 20, is preferably programmed to be a central repository for the items stored in connection with the present invention.

In a preferred embodiment, users in environment 10 use the present invention in a distributed fashion by using one or more of computers 17 that is in communication with server 20. As will be appreciated more fully in view of the discussion below, users operating computers 17 can provide original information or modification information to data stored on server 20. This information is relied upon by software application developers and coders to generate a particular software application.

Figure 2:
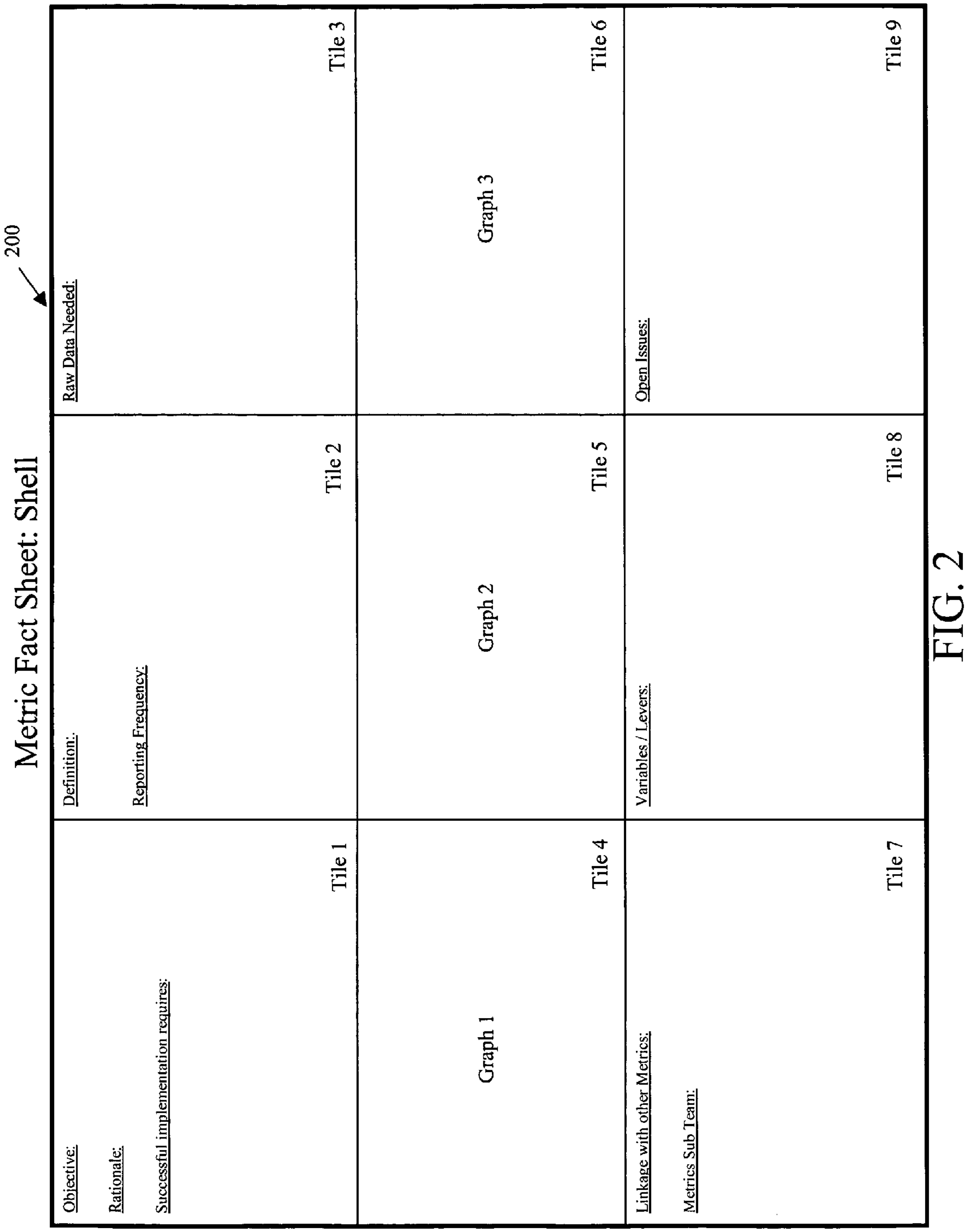
FIG. 2 is a template of an exemplary primary fact sheet in accordance with the present invention.

FIG. 2 shows an exemplary shell or "template" 200 of a typical primary fact sheet in accordance with the present invention. Each fact sheet preferably represents a particular metric or function that is associated with the software application to be generated. Detailed examples of several different primary fact sheets are provided in FIGS. 3-18. As shown in FIG. 2, template 200 is divided into nine tiles each having substantially the same area, and forming a 3×3 table 9 (although different numbers of rows and columns are also intended to be within the scope of the present invention). For purposes of discussion, these tiles are numbered Tile 1-Tile 9, with Tile 1 being at the upper left hand corner and Tile 9 being at the lower right hand corner. Using this convention, tile 3 is at the upper right hand corner, as shown in FIG. 2.

Tile 1 preferably provides summary information about the objective, rationale and requirements for successful implementation of a given metric represented by the fact sheet. Tile 2 provides a clear definition of what the represented metric is, and how often it is reported to a client, for example. Tile 3 is provided to identify any raw data that is needed to compute the given metric.

Tiles 4-6 are preferably reserved for graphical representations of data, and are shown with Graph 1, Graph 2 and Graph 3.

Tile 7 preferably identifies linkages with other metrics (and, thus, corresponding fact sheets), and further identifies personnel knowledgeable about the given metric. Tile 8 is preferably reserved for listing variables or levers associated with a given metric. This aspect of a fact sheet is better understood when described in connection with an actual example described later herein. Finally, Tile 9 is preferably reserved for identifying open issues related to a given metric. Such open issues might be identified by the metrics sub team identified in Tile 7, or by programmers/coders who have access to the fact sheets and who may want to post an issue or problem that has come up that needs discussion.

FIG. 3 is the first of several fact sheets included in the drawings and is used to further explain features of the present invention. FIG. 3 shows a fact sheet that represents a metric called Projected Average Hourly Rate.

Referring to the Projected Average Hourly Rate fact sheet of FIG. 3, Tile 1 includes general information about the particular metric being presented. There are comments related to the objective and rationale underlying the metric, as well as information regarding the requirements for successful implementation. The stated objective of this particular metric is to optimize resource utilization and skill set mix, drive down the average hourly rate of project development expense without adversely effecting quality, while, concurrently, to optimize the average hourly rate such that it should not come at the expense of project delivery requirements.

The rationale is stated as improving cost effectiveness and ensuring appropriate staffing mix. Finally, it is stated that successful implementation requires effective demand planning to ensure optimal staff augmentation cost structure and staffing mix. This information gives the viewer of the fact sheet useful context in interpreting and understanding the remaining portion of the fact sheet.

Tile 2 provides a concise definition of the metric, including a mathematical formula to arrive at the metric, and how often the metric is to be reported, which in this case, is monthly. Tile 3 lists the raw data that is needed to effect the calculation set forth in Tile 2. Tile 3 provides programmers the quick information necessary to identify and capture the appropriate data to quantify the metric of Projected Hourly rate. Tiles 4-6, which make up the middle row of the 3×3 table, identify the type of graphical output that the application in development should provide with respect to this metric. These tiles also indicate the types of reports that should be available to an end user. In the example of FIG. 3, three different graphs are provided: Weighted Average Hourly Rate—Rolling 12 months, Average Hourly Rate by Resource Type—Rolling 12 Months, and Mix of Hours Utilized. Each of Tiles 4-6 also preferably clearly identifies report types to be generated.

Tile 7 indicates how the instant metric may be linked with other metrics, thereby providing a developer information about where data can be found. This information may be important, especially in the case where a developer is not familiar with related metrics (or program functions). This tile also lists the personnel responsible for the given metric so that appropriate points of contact are readily available to developers. In the more general business project case, a decision maker will rarely make a decision based on only a portion of the information that may be available. Thus, Tile 7 is preferably used by such decision makers to gather still other information that is related to the particular details offered by a given fact sheet.

Tile 8 is entitled "Variables/Levers" and preferably supplies information that provides a more comprehensive understanding of the scope of the metric being described by the fact sheet. For example, in the exemplary Projected Average Hourly Rate fact sheet of FIG. 3, one of the items listed in Tile 8 is "achieve better pricing value for traditional consultants." This indicates that this metric can be monitored for the purpose of driving better value from consultants. That is, if the projected hourly rate appears to be too high for a given project, management can approach the consultant and request an adjustment of hourly rates, or a discount with respect to a final cost.

Finally, Tile 9 is preferably reserved for descriptions of open issues that can be presented to developers or others users of the fact sheets. In this case, no open issues are identified.

FIGS. 4-18 show a plurality of other exemplary primary fact sheets that can be used in developing or managing an application. As will be appreciated by those skilled in the art, these other fact sheets preferably have similar overall structures, but, of course, include data and information relevant to the given metric that is being represented.

In addition to the primary fact sheets of FIGS. 3-18, some of the primary fact sheets or even specific tiles associated with a given fact sheet may also include further back-up materials and information. Such information is preferably stored on a "secondary fact sheet" an example of which is shown in FIG. 19. This secondary fact sheet example provides more detailed information about the metric Projected Average Hourly Rate (FIG. 3). The secondary fact sheet of FIG. 19 preferably provides detailed formulas and definitions that provide a programmer substantially all of the core information that might be necessary to prepare a program module to calculate the particular metric.

Both the primary fact sheets and secondary fact sheets can be generated using well-known software applications such as Microsoft Excel, relational databases, or even custom-written code developed specifically for this purpose. The invention is most preferably implemented so that the fact sheets can be made available via conventional web-browsers.

In a preferred embodiment, at least the primary fact sheets are grouped together in a fact sheet dictionary that is then stored, e.g., on server 20 (FIG. 1) together with respect to an overall application. In this way, developers and managers can effectively review and modify the information contained in the fact sheets. Because the environment in which the present invention is preferably operated is a network environment, managers, programmers, and coders can all preferably access the fact sheets and further refine them as desired. This leads to an overall better final product (software application being developed) as each interested party has access to substantially all of the core materials necessary to develop an application.

Figure 20:
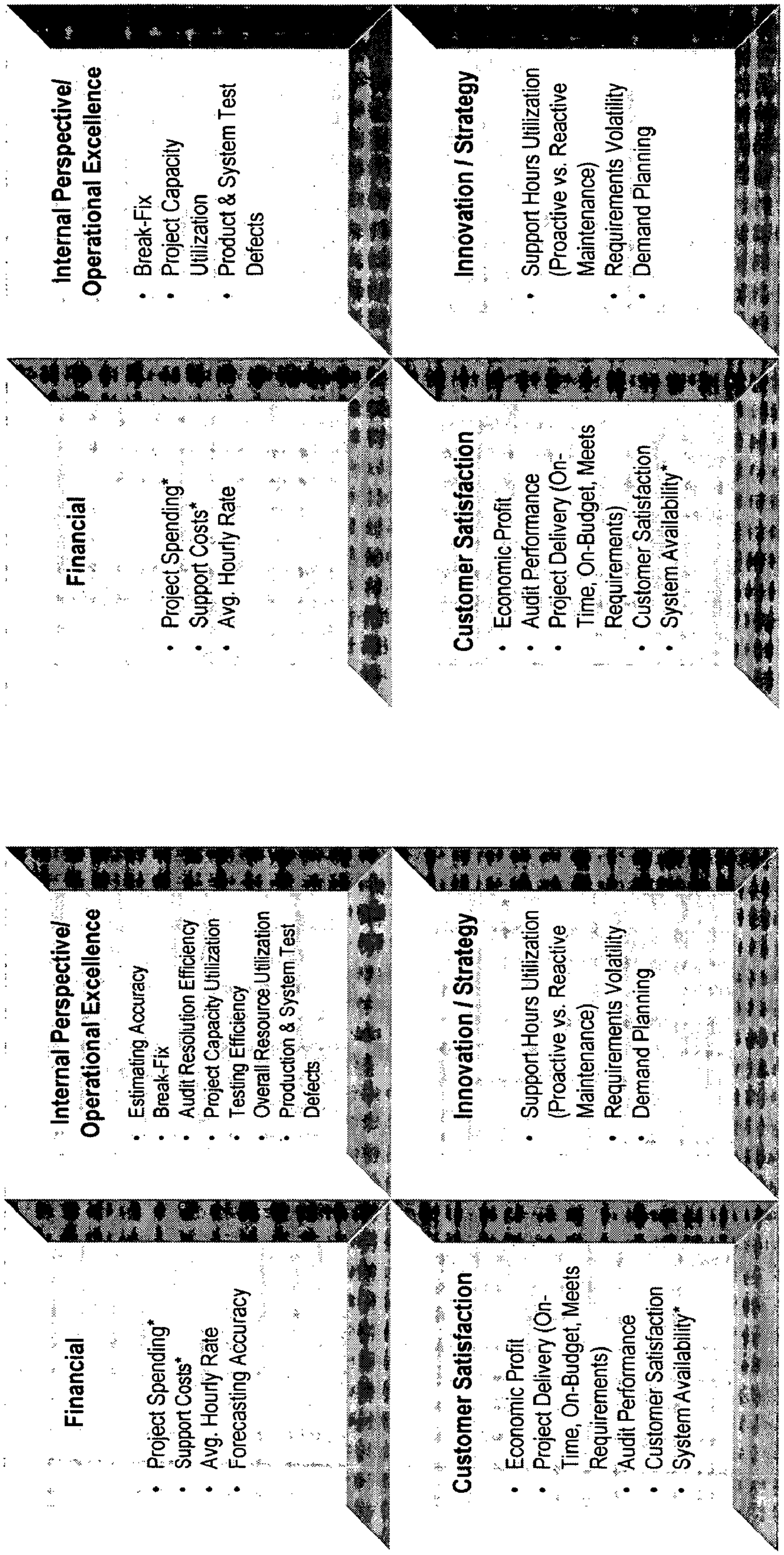
FIG. 20 shows an exemplary scorecard in accordance with the present invention.

FIG. 20 depicts listings of information available via two different "scorecards." The scorecard on the left hand side of FIG. 20 preferably lists metrics that correspond, or substantially correspond, to the metrics of a given fact sheet dictionary, like the collection of fact sheets shown in FIGS. 3-18. The scorecard on the right hand side of FIG. 20 preferably lists a subset of the metrics listed on the left hand side scorecard. The scorecard on the right is one that is preferably tailored for client consumption. That is, not all of the internal details of an ongoing application development project necessarily need to be provided or made available to the ultimate client of the software application. Some information, such as Forecasting Accuracy (FIG. 16), may not be relevant to an external client.

In a preferred embodiment, a user of the system might be presented with one of these scorecards in the format shown, or in a menu format, as might be available via a Windows (Microsoft Corp., Redmond, Wash.)-type user interface/operating system. By selecting a given metric, the user is then presented with an appropriate fact sheet, and if available, also any secondary fact sheets associated with that fact sheet. In one possible implementation, the scorecards are made available via a web browser and users can select links associated with each of the metrics. A web server (perhaps server 20, or separate dedicated web server) would then "serve up" the appropriate fact sheet.

Figure 21:
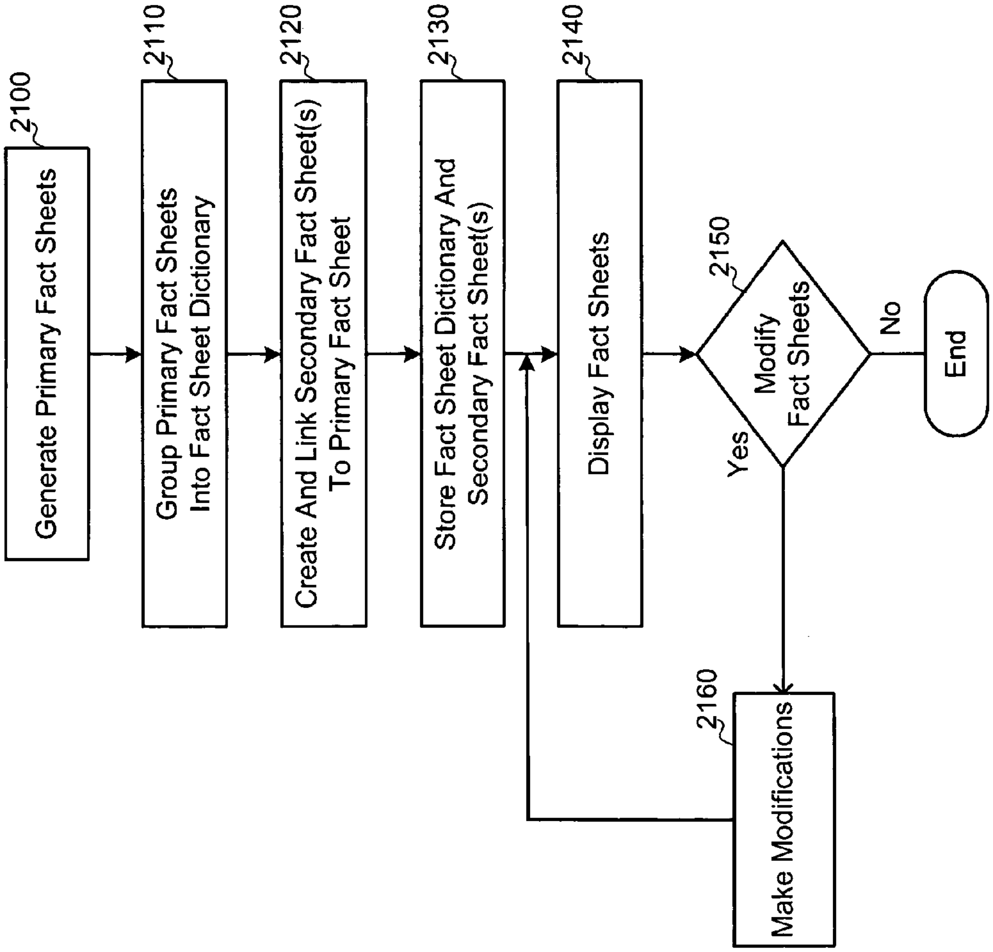
FIG. 21 is a flow chart depicting exemplary steps for practicing embodiments of the present invention.

In a typical implementation, the present invention might operate in the following manner, as depicted in FIG. 21. On a computer, a plurality of primary fact sheets are generated, step 2100. The primary fact sheets are then grouped together into a fact sheet dictionary, step 2110, which substantially characterizes fundamental requirements of a software application being developed. This can be performed using an existing requirements document, or even without such a document. Then, at step, 2120, at least one secondary fact sheet is created and linked to at least one of the fact sheets or a particular portion (e.g., tile) of a primary fact sheet. As explained previously, a secondary fact sheet provides additional details about an attribute of a particular metric.

At step 2130, the fact sheet dictionary and any secondary fact sheets are stored in memory of the computer (e.g., server 20) so that the fact sheet dictionary and secondary fact sheets can be retrieved together in respect to a software application being designed and developed. The fact sheets are then made available for display, step 2140, e.g., via a web browser or other means. If, at step 2150, it is determined that no other changes are needed to the fact sheets, then the process ends and the fact sheets can be considered finalized and available for use by programmers and developers. If, on the other hand, it is determined that modifications are necessary, then at step 2160, any such modifications are made and the fact sheets are again made available for display at step 2140.

Those skilled in the art will appreciate that the fact sheets (primary and secondary) described herein are used as summary tools for, e.g., business personnel generally, and in the particular example provided herein, developers to implement software applications. These fact sheets are, accordingly, preferably available to the developers at any time during the development process. The fact sheets provide a clear roadmap that developers can follow, in contrast to the oftentimes complex and unfriendly conventional software requirements documents. Where modifications to additional fact sheets are deemed necessary, the procedure outlined above and depicted in FIG. 21 can be initiated. This provides developers and managers increased latitude in designing and developing a given software application.

In accordance with other aspects of the methodology described herein, the present invention preferably also includes providing a network of computers and the step of modifying fact sheets allows for different users to perform this step in a distributed fashion.

In accordance with still other aspects of the inventive methodology, there is preferably provided the ability to generate and present a performance scorecard that provides access to summary information about each of the metrics, or directly to the fact sheets themselves. In a preferred embodiment, different types of scorecards are made generated in view of the potentially different audiences (e.g., internal versus external personnel) that might want to access information via the scorecard.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for facilitating and managing a business project, comprising:

generating, on a computer, a plurality of primary fact sheets, each primary fact sheet comprising a plurality of tiles wherein each tile is presented in one cell of a matrix comprising a predetermined number of rows and columns of tiles on a respective primary fact sheet, each tile representing a predetermined attribute of a particular metric that is represented by the respective primary fact sheet, wherein the particular metric is associated with generating a software application for the business project;

grouping, on the computer, the plurality of primary fact sheets into a fact sheet dictionary, the fact sheet dictionary substantially characterizing fundamental requirements of the business project;

linking at least one secondary fact sheet to at least one of the tiles, the at least one secondary fact sheet providing additional details about the attribute of the particular metric;

storing the fact sheet dictionary and the at least one secondary fact sheet in memory of the computer so that the fact sheet dictionary and the at least one secondary fact sheet can be retrieved together in respect to the business project;

modifying at least portions of the primary fact sheets and the at least one secondary fact sheet in accordance with changes made to the requirements of the business project;

displaying on the computer, on demand, at least one of the at least one stored primary fact sheets and at least one secondary fact sheets; and linking the particular metric with another metric that is represented by another primary fact sheet contained in the plurality of fact sheets.

2. The method of claim 1, further comprising providing a network of computers to which the computer is connected, wherein the step of modifying comprises modifying the primary fact sheets from another computer that is also connected to the network of computers.

3. The method of claim 1, wherein each primary fact sheet comprises three rows of three tiles each.

4. The method of claim 1, wherein each primary fact sheet has substantially the same structure.

5. The method of claim 1, further comprising generating and presenting on the computer a performance scorecard that provides access to summary information about each of the metrics.

6. The method of claim 1, further comprising generating and presenting on the computer a first performance scorecard that is suitable for internal review, and a second performance scorecard, different from the first scorecard, that is suitable for external review.

7. A distributed method of designing and developing a business project, comprising:

providing a network of computers;

providing, via the network of computers, shells of respective ones of a plurality of fact sheets, each fact sheet comprising a plurality of tiles wherein each tile is positioned in one cell of a predetermined number of rows and columns, each tile representing a predetermined attribute of a particular metric that is represented by the respective fact sheet, wherein the particular metric is associated with generating a software application for the business project;

creating a plurality of primary fact sheets by storing information in association with the tiles of the shells of the respective ones of a plurality of fact sheets, the information corresponding to requirements of the business project;

grouping, on one of the computers, the plurality of fact sheets into a fact sheet dictionary, the fact sheet dictionary substantially characterizing substantially all requirements of the business project;

linking at least one secondary fact sheet to at least one of the tiles, the at least one secondary fact sheet providing additional details about the attribute of the particular metric;

storing the fact sheet dictionary and the at least one secondary fact sheet in memory of the computer so that the fact sheet dictionary and the at least one secondary fact sheet can be retrieved together in respect to the business project;

modifying at least portions of the primary fact sheets in accordance with changes made to the requirements of the business project;

displaying on the computer, on demand, at least one of a stored primary fact sheets; and linking the particular metric with another metric that is represented by another primary fact sheet contained in the plurality of fact sheets.

8. The method of claim 7, wherein each primary fact sheet comprises three rows of three tiles each.

9. The method of claim 7, wherein each primary fact sheet has substantially the same structure.

10. The method of claim 7, further comprising generating and presenting on the computer a performance scorecard that provides access to summary information about each of the metrics.

11. The method of claim 7, further comprising generating and presenting on the computer a first performance scorecard that is suitable for internal review, and a second performance scorecard, different from the first scorecard, that is suitable for external review.

12. A system for facilitating the management of a business project, comprising:

a network of computers, wherein one of the computers is programmed to function as a server and other computers in the network are programmed to access the server;

the server being programmed to generate shells of respective ones of a plurality of fact sheets, each fact sheet comprising a plurality of tiles wherein each tile is positioned in one cell of a predetermined number of rows and columns, each tile representing a predetermined attribute of a particular metric that is represented by the respective fact sheet, wherein the particular metric is associated with managing a software application for the business project;

at least one of the other computers in the network being programmed to receive user input to create a plurality of primary fact sheets by storing information in association with the tiles of the shells of the respective ones of a plurality of fact sheets, the information corresponding to requirements of the business project; and the server being further programmed to group the plurality of fact sheets into a fact sheet dictionary for display on one of the server and one of the other computers in the network, the fact sheet dictionary substantially characterizing substantially all requirements of the business project and further programmed to:

link at least one secondary fact sheet to at least one of the tiles, the at least one secondary fact sheet providing additional details about the attribute of the particular metric;

store the fact sheet dictionary and the at least one secondary fact sheet in memory of the computer so that the fact sheet dictionary and the at least one secondary fact sheet can be retrieved together in respect to the business project; and link the particular metric with another metric that is represented by another primary fact sheet contained in the plurality of fact sheets.

13. The system of claim 12, wherein each primary fact sheet comprises three rows of three tiles each.

14. The system of claim 12, wherein each primary fact sheet has substantially the same structure.

15. The system of claim 12, wherein the server is further programmed to generate and present a performance scorecard that provides access to summary information about each of the metrics.

16. The system of claim 15, wherein the server is further programmed to generate and present a first performance scorecard that is suitable for internal review, and a second performance scorecard, different from the first scorecard, that is suitable for external review.

17. A method for facilitating the design and development of a software application, comprising:

generating, on a computer, a plurality of primary fact sheets, each primary fact sheet comprising a plurality of tiles wherein each tile is presented in one of a predetermined number of rows of tiles on a respective primary fact sheet, each tile representing a predetermined attribute of a particular metric that is represented by the respective primary fact sheet, wherein the particular metric is associated with generating the software application;

grouping, on the computer, the plurality of primary fact sheets into a fact sheet dictionary, the fact sheet dictionary substantially characterizing fundamental requirements of the software application;

linking at least one secondary fact sheet to at least one of the tiles, the at least one secondary fact sheet providing additional details about the attribute of the particular metric;

storing the fact sheet dictionary and the at least one secondary fact sheet in memory of the computer so that the fact sheet dictionary and the at least one secondary fact sheet can be retrieved together in respect to the software application being designed and developed;

modifying at least portions of the primary fact sheets and the at least one secondary fact sheet in accordance with changes made to the requirements of the software application;

displaying on the computer, on demand, at least one of the stored primary fact sheets and secondary fact sheet; and linking the particular metric with another metric that is represented by another primary fact sheet contained in the plurality of fact sheets.

18. The method of claim 17, further comprising providing a network of computers to which the computer is connected, wherein the step of modifying comprises modifying the primary fact sheets from another computer that is also connected to the network of computers.

19. The method of claim 17, wherein each primary fact sheet comprises three rows of three tiles each.

20. The method of claim 17, wherein each primary fact sheet has substantially the same structure.

21. The method of claim 17, wherein the particular metric comprises at least one of projected hourly rate, project capacity utilization, overall resource utilization, support hours by activity and/or application group, economic profit, audit issues performance, audit issues resolution efficiency, testing efficiency, production and system test defects, customer satisfaction, break-fix cost, requirement volatility, project delivery, forecasting accuracy, demand planning, and estimating accuracy.

22. The method of claim 17, further comprising generating and presenting on the computer a performance scorecard that provides access to summary information about each of the metrics.

23. The method of claim 17, further comprising generating and presenting on the computer a first performance scorecard that is suitable for internal review, and a second performance scorecard, different from the first scorecard, that is suitable for external review.

24. The method of claim 17, further comprising using information from the fact sheet dictionary to code the software application.

25. The method of claim 17, further comprising using a requirements document to form the basis for at least one of the primary fact sheets.

26. A distributed method of managing a software application, comprising:

providing a network of computers;

providing, via the network of computers, shells of respective ones of a plurality of fact sheets, each fact sheet comprising a plurality of tiles wherein each tile is positioned in one of a predetermined number of rows, each tile representing a predetermined attribute of a particular metric that is represented by the respective fact sheet, wherein the particular metric is associated with managing the software application;

creating a plurality of primary fact sheets by storing information in association with the tiles of the shells of the respective ones of a plurality of fact sheets, the information corresponding to information gleaned from requirements of the software application;

grouping, on one the computers, the plurality of fact sheets into a fact sheet dictionary, the fact sheet dictionary substantially characterizing substantially all requirements of the software application;

modifying at least portions of the primary fact sheets in accordance with changes made to the requirements of the software application;

displaying on the computer, on demand, at least one of a stored primary fact sheets;

linking at least one secondary fact sheet to at least one of the tiles, the at least one secondary fact sheet providing additional details about the attribute of the particular metric;

storing the fact sheet dictionary and the at least one secondary fact sheet in memory of the computer so that the fact sheet dictionary and the at least one secondary fact sheet can be retrieved together in respect to the business project; and linking the particular metric with another metric that is represented by another primary fact sheet contained in the plurality of fact sheets.

27. The method of claim 26, wherein each primary fact sheet comprises three rows of three tiles each.

28. The method of claim 26, wherein each primary fact sheet has substantially the same structure.

29. The method of claim 26, wherein the particular metric comprises at least one of projected hourly rate, project capacity utilization, overall resource utilization, support hours by activity and/or application group, economic profit, audit issues performance, audit issues resolution efficiency, testing efficiency, production and system test defects, customer satisfaction, break-fix cost, requirement volatility, project delivery, forecasting accuracy, demand planning, and estimating accuracy.

30. The method of claim 26, further comprising generating and presenting on the computer a performance scorecard that provides access to summary information about each of the metrics.

31. The method of claim 26, further comprising generating and presenting on the computer a first performance scorecard that is suitable for internal review, and a second performance scorecard, different from the first scorecard, that is suitable for external review.

32. The method of claim 26, further comprising using information from the fact sheet dictionary to code the software application.

33. The method of claim 26, further comprising gleaning the information from a software requirements document.

34. A system for facilitating the development of a software application, comprising:

a network of computers, wherein one of the computers is programmed to function as a server and other computers in the network are programmed to access the server;

the server being programmed to generate shells of respective ones of a plurality of fact sheets, each fact sheet comprising a plurality of tiles wherein each tile is positioned in one of a predetermined number of rows, each tile representing a predetermined attribute of a particular metric that is represented by the respective fact sheet, wherein the particular metric is associated with generating a software application for the business project;

at least some of the other computers in the network being programmed to receive user input to create a plurality of primary fact sheets by storing information in association with the tiles of the shells of the respective ones of a plurality of fact sheets, the information corresponding to information gleaned from requirements of the software application; and the server being further programmed to group the plurality of fact sheets into a fact sheet dictionary for display on the server or one of the other computers in the network, the fact sheet dictionary substantially characterizing substantially all requirements of the software application and further programmed to:

link at least one secondary fact sheet to at least one of the tiles, the at least one secondary fact sheet providing additional details about the attribute of the particular metric;

store the fact sheet dictionary and the at least one secondary fact sheet in memory of the computer so that the fact sheet dictionary and the at least one secondary fact sheet can be retrieved together in respect to the business project; and link the particular metric with another metric that is represented by another primary fact sheet contained in the plurality of fact sheets.

35. The system of claim 34, wherein each primary fact sheet comprises three rows of three tiles each.

36. The system of claim 34, wherein each primary fact sheet has substantially the same structure.

37. The system of claim 34, wherein the particular metric comprises at least one of projected hourly rate, project capacity utilization, overall resource utilization, support hours by activity and/or application group, economic profit, audit issues performance, audit issues resolution efficiency, testing efficiency, production and system test defects, customer satisfaction, break-fix cost, requirement volatility, project delivery, forecasting accuracy, demand planning, and estimating accuracy.

38. The system of claim 34, wherein the server is further programmed to generate and present a performance scorecard that provides access to summary information about each of the metrics.

39. The system of claim 38, wherein the server is further programmed to generate and present a first performance scorecard that is suitable for internal review, and a second performance scorecard, different from the first scorecard, that is suitable for external review.

* * * * *